(12) United States Patent
Matsuzawa et al.

(10) Patent No.: US 9,116,288 B2
(45) Date of Patent: Aug. 25, 2015

(54) OPTICAL INSTRUMENT, AND CONTROL METHOD FOR OPTICAL INSTRUMENT

(75) Inventors: Yoshinori Matsuzawa, Hachioji (JP); Manabu Ichikawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 193 days.

(21) Appl. No.: 13/527,254

(22) Filed: Jun. 19, 2012

(65) Prior Publication Data
US 2012/0327290 A1 Dec. 27, 2012

(30) Foreign Application Priority Data

Jun. 23, 2011 (JP) ................................ P2011-139874

(51) Int. Cl.
*G02B 7/10* (2006.01)
*G02B 27/64* (2006.01)
*G03B 3/02* (2006.01)
*G03B 17/20* (2006.01)
*G03B 17/14* (2006.01)
*H04N 5/232* (2006.01)

(52) U.S. Cl.
CPC .............. *G02B 7/102* (2013.01); *G02B 27/646* (2013.01); *G03B 3/02* (2013.01); *G03B 17/20* (2013.01); *H04N 5/23212* (2013.01); *H04N 5/23245* (2013.01); *G03B 17/14* (2013.01); *G03B 2206/00* (2013.01)

(58) Field of Classification Search
USPC ......................................................... 348/352
See application file for complete search history.

(56) References Cited

U.S. PATENT DOCUMENTS

| | | | |
|---|---|---|---|
| 5,832,318 A * | 11/1998 | Sato et al. ..................... 348/345 |
| 6,727,949 B1 * | 4/2004 | Saruwatari et al. ........... 348/349 |
| 8,475,041 B2 | 7/2013 | Takemoto |
| 8,611,739 B2 | 12/2013 | Honjo |
| 2008/0030594 A1 * | 2/2008 | Terada ........................ 348/221.1 |
| 2009/0279192 A1 * | 11/2009 | Harada et al. ................. 348/345 |
| 2010/0141801 A1 * | 6/2010 | Okamoto et al. ........... 348/240.3 |
| 2011/0304765 A1 * | 12/2011 | Yogo et al. .................... 348/345 |

FOREIGN PATENT DOCUMENTS

| JP | 07-135596 | 5/1995 |
|---|---|---|
| JP | 07-199288 | 8/1995 |
| JP | 2002-335436 | 11/2002 |
| JP | 2005-099341 | 4/2005 |
| JP | 2008-042404 | 2/2008 |

OTHER PUBLICATIONS

Office Action from corresponding Japanese Patent Application Serial No. 2011-139874 (4 pgs.) mailed Feb. 2, 2015.

* cited by examiner

*Primary Examiner* — Jason Flohre
(74) *Attorney, Agent, or Firm* — John C. Pokotylo; Straub & Pokotylo

(57) ABSTRACT

An optical instrument of the present invention comprises a ring member which is arranged to be rotatable with respect to a lens barrel, and also to slide in an optical axis direction to a first position and a second position, a rotation position detection section for outputting a preset distance that has been set by a rotation operation, when the ring member is at the second position, and a control section for, when the ring member has been subjected to a slide operation between the first position and the second position, moving a photographing lens at a first speed or a second speed up to a distance corresponding to an operation position.

4 Claims, 20 Drawing Sheets

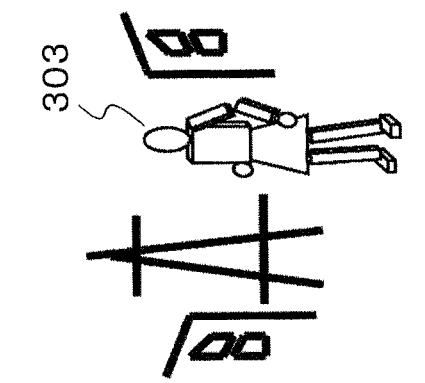
FIG. 8B
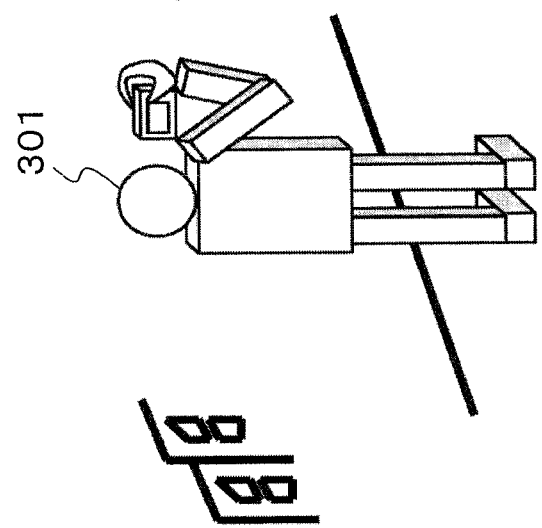
FIG. 8A
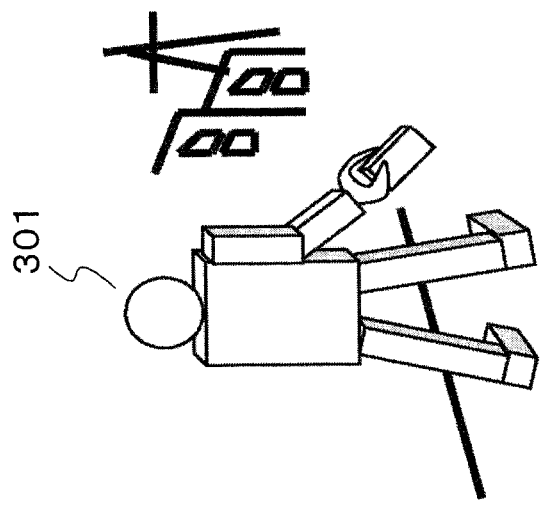

OPTICAL INSTRUMENT, AND CONTROL METHOD FOR OPTICAL INSTRUMENT

Benefit is claimed, under 35 U.S.C. §119, to the filing date of prior Japanese Patent Application No. 2011-139874 filed on Jun. 23, 2011. This application is expressly incorporated herein by reference. The scope of the present invention is not limited to any requirements of the specific embodiments described in the application.

BACKGROUND OF THE INVENTION

1. Field of the Invention

The present invention relates to an optical instrument capable of focusing to a preset distance, and to a control method for an optical instrument.

2. Description of the Related Art

Imaging devices with a function to shoot still pictures during shooting of a movie are known. Generally, if focusing at the time of shooting a movie is carried out at high speed the movie will become a boon to visually unappealing, and so a focusing lens is generally driven at low speed. However, there is a need for focusing speed in the case where still picture shooting is instructed during shooting of the movie. It has therefore being proposed to switch the drive speed of focusing winds still picture shooting is instructed during shooting of the movie (refer to Japanese patent number 3466679 (registered Aug. 29, 2003)).

SUMMARY OF THE INVENTION

An object of the present invention is to provide an optical instrument that switches drive speed of a focusing lens in accordance with camera state and subject state, when switching focusing modes, and a control method for an optical instrument.

An optical instrument of the present invention comprises a focusing lens provided in a lens barrel, a lens drive section for driving the focusing lens, a ring member which is arranged to be rotatable with respect to a lens barrel, and arranged to slide in an optical axis direction, a slide position detection section for detecting whether the ring member is at a first position or a second position, when the ring member has been subjected to slide movement in the optical axis direction, a rotation position detection section for outputting a preset distance that has been set by a rotation operation as a digital signal, when the ring member is at the second position, and a control section for, when the ring member has been subjected to slide movement between the first position and the second position, making drive speed of the photographing lens that is driven by the lens drive section different for when shooting a movie and when in shooting standby.

An optical instrument of the present invention comprises a ring member which is arranged to be rotatable with respect to a lens barrel, and also to slide in an optical axis direction to a first position and a second position, a rotation position detection section for outputting a preset distance, that has been set by a rotation operation, as a digital signal, when the ring member is at the second position, and a control section for, when the ring member has been subjected to a slide operation between the first position and the second position, moving a photographing lens at a first speed or a second speed up to a distance corresponding to an operation position.

Also, an optical instrument of the present invention comprises a focusing section for performing focus of the photographing lens to a discrete preset distance, a movement determination section for determining amount of movement of a subject, and a drive control section for, when carrying out focus to the preset distance using the focusing section, controlling drive speed of the focusing lens based on the movement amount that has been determined by the movement determination section.

Also, a control method for an optical instrument of the present invention, having a ring member which is arranged to be rotatable with respect to a lens barrel, and also slidable in an optical axis direction, comprises determining whether or not there has been slide movement of the ring member in the optical axis direction, and, if the result of the determination is that there has been slide movement of the ring member between the first position and the second position, making drive speed of the photographing lens that is driven by a lens drive section different for when shooting a movie and when in shooting standby.

BRIEF DESCRIPTION OF THE DRAWING

FIG. 8A and FIG. 8B are drawings showing the appearance of taking photographs when set to range focus mode, with the camera of one embodiment of the present invention.

DETAILED DESCRIPTION OF THE PREFERRED EMBODIMENTS

Figure 1:
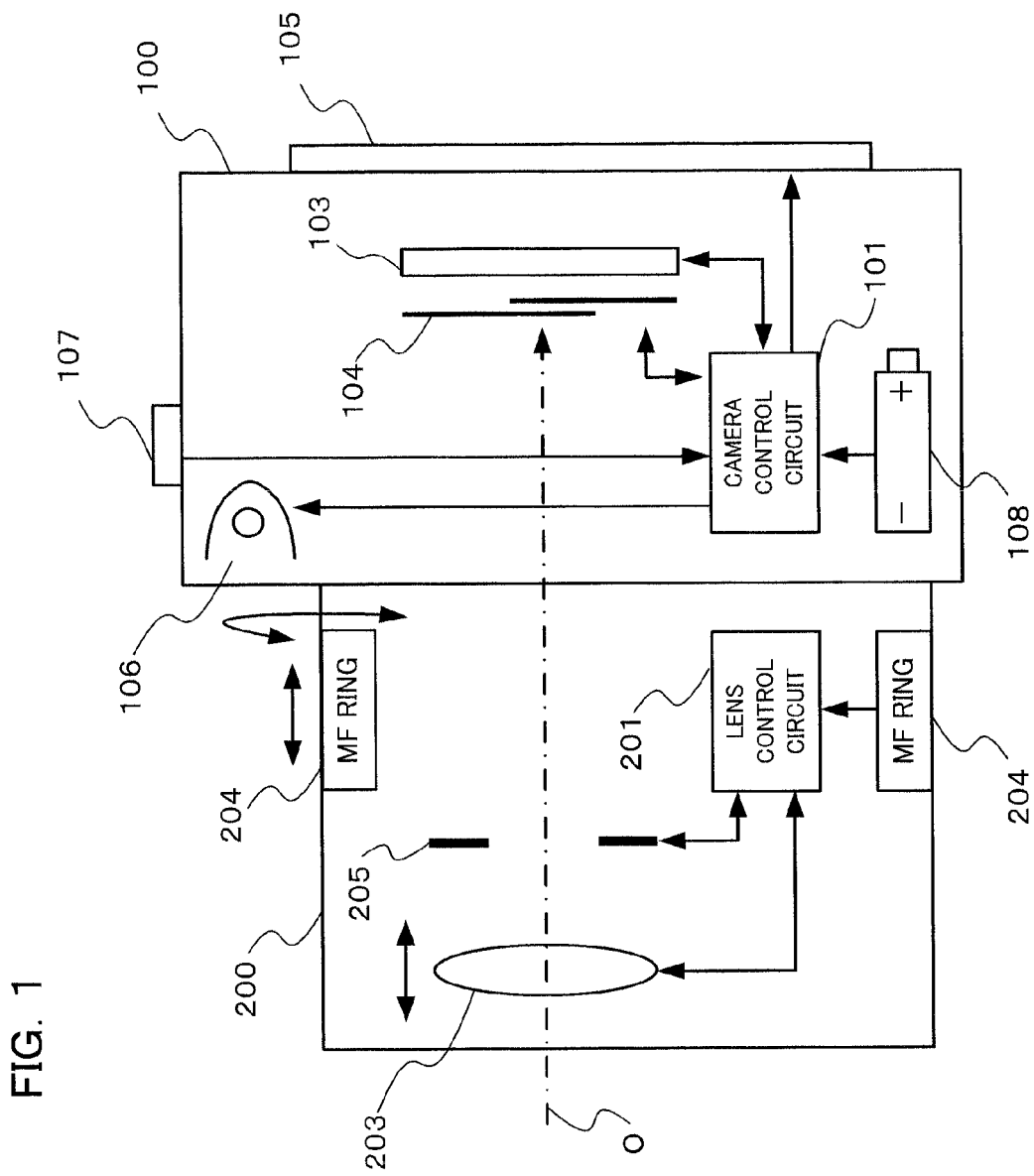
FIG. 1 is a block diagram showing the internal structure of a camera relating to one embodiment of the present invention.

A preferred embodiment using a camera to which the present invention has been applied will be described in the following in accordance with the drawings. FIG. 1 is a block diagram showing the structure of a camera relating to one embodiment of the present invention, and this camera is a digital camera comprising a camera body 100 and an interchangeable lens 200. The interchangeable lens 200 is removably attached to the camera body 110 by means of a bayonet mount. With this embodiment, the camera body 100 and the interchangeable lens 200 are constructed separately, but they may also be constructed integrally.

A camera control circuit 101, image sensor 103, focal plane shutter 104, display monitor 105, strobe unit 106, release button 107 and battery 108 etc. are arranged inside the camera body 100. Also, a lens control circuit 201, focusing lens 203, MF (Manual Focus) ring 204 and aperture 205 etc. are arranged inside the interchangeable lens 200.

The camera control circuit 101 is made up of an ASIC (application-specific integrated circuit) including a CPU (central processing unit) 121 (refer to FIG. 2) etc., and peripheral circuits of the ASIC. If a photographer operates the release button 107, the camera control circuit 101 controls the image sensor 103 and focal plane shutter 104 etc., as well as carrying out firing control of the strobe unit 106 as required, and executes shooting operations etc. by means of the lens control circuit 201. Various sequences for the entire camera are collectively controlled in collaboration with a lens CPU 221 (referred to FIG. 2) within the lens control circuit 201, which will described later. This control is executed in accordance with programs that have been stored in a flash ROM 122 (referred to FIG. 2). Details of this camera control circuit 101 will be described later using FIG. 2.

The image sensor 103 is constructed using a solid-state image sensor such as a CCD (Charge Coupled Device) image sensor or a CMOS (Complementary Metal Oxide Semiconductor) image sensor, and converts a subject image that has been formed by the interchangeable lens 200 into image signals. Specifically, image signals are accumulated in the image sensor 103, or image signals are read out, in accordance with signals from the camera control circuit 101. In this specification, signals based on output from the image sensor 103 may be referred to as image data as well as image signals.

The focal plane shutter 104 performs opening and closing operations in response to an instruction from a shutter control circuit 126 (refer to FIG. 2) within the camera control circuit 101, based on the release button 107 being pressed down fully, and opens and closes subject light flux from the interchangeable lens 200. The opening and closing time is a time corresponding to a shutter speed that has been calculated by the camera control circuit 101.

The display monitor 105 is constituted by an LCD or organic EL etc. arranged on the rear surface or the like of the camera body. The display monitor 105 carries out live view display at the time of still picture shooting standby and movie shooting, playback display of taken images that have already been stored in accordance with the operation of a playback button etc., and display of setting information on menus screen or the like in response to operation of a menu button etc.

The strobe unit 106 irradiates supplementary light to a subject in accordance with a command from a strobe control circuit 125 (refer to FIG. 2) within the camera control circuit 101, in a case where the surrounding area is dark at the time of operation of the release button 107. This light emission is carried out in synchronization with an exposure operation of the focal plane shutter 104, using charge that has been stored in an emission capacitor (not shown).

The release button 107 is made up of a first release switch 132 (refer to FIG. 2) that turns on when the button is pressed down halfway, and a second release switch 133 (refer to FIG. 2) that is turned on when the button is pressed down further from the half-pressed state to be pressed down fully. The camera control circuit 101 executes shooting preparation sequences, such as AE (auto exposure) operation and AF (autofocus) operation if the first release switch 132 is turned on. Also, if the second release switch 133 is turned on shooting is carried out by executing a series of shooting sequences to control the focal plane shutter 104 etc., acquire image data based on a subject image from the image sensor 103 etc., and store this image data in a storage medium.

The battery 108 supplies power to respective members and respective circuits within the camera body 100 and the interchangeable lens 200.

The lens control circuit 201 within the interchangeable lens 200 is made up of an ASIC including a lens CPU etc., and its peripheral circuits. In response to a command from the camera control circuit 101, or the user operating the MF ring 204, drive control etc. for the focusing lens 203 and the aperture 205 is carried out. Various lens information, such as focal length, set length, and aperture value, is sent in response to a request from the camera control circuit 101. This control is executed in accordance with programs that have been stored in a flash ROM (not shown). Details of this lens control circuit 201 will be described later using FIG. 2.

The focusing lens 203 moves in the optical axis direction based on instruction from the lens control circuit 201, and adjusts the focused state of the interchangeable lens 200. In this embodiment, the lens is described as a fixed focal length lens, but it may also be constituted by a zoom lens for which focal length can be varied.

The MF ring 204 is arranged on the outer periphery of the interchangeable lens 200, being capable of a rotation operation around the optical axis of the interchangeable lens 200 and also capable of a slide operation along the optical axis direction between a first position and a second position. By carrying out a rotation operation at a first position where the MF ring 204 having been slid toward the front of the interchangeable lens 200 (toward the subject), a manual focus operation is possible. Also, by performing a rotation operation at the second position where the MF ring 204 has been slid to the rear of the interchangeable lens 200 (toward the photographer), a range focus operation is possible. The MF ring 204 functions as a ring member arranged to be rotatable with respect to a lens barrel, and also arranged to slide in an optical axis direction. The first position and the second position of the MF ring 204 will be described later using FIG. 3 and FIG. 4.

The aperture 205 has its opening area changed based on instruction from the lens control circuit 201, and adjusts light amount of subject light flux that passes through the interchangeable lens 200.

Figure 2:
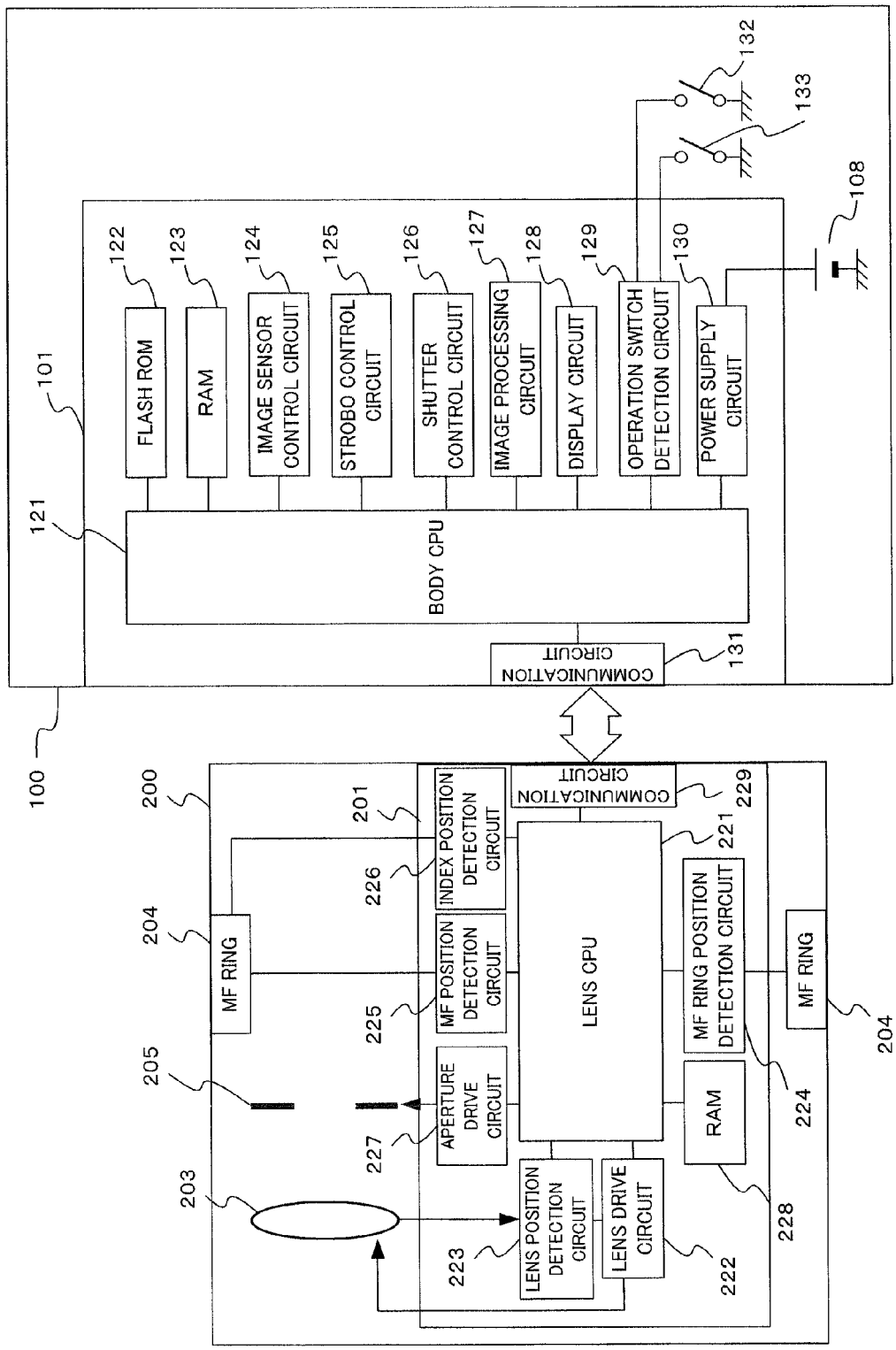
FIG. 2 is a block diagram mainly showing the electrical structure of a camera of one embodiment of the present invention.

Next, details of the camera control circuit 101 lens control circuit 201 will be described using FIG. 2. A body CPU 121 is provided within the camera control circuit 101, and a flash ROM (read only memory) 122, RAM (random access memory) 123, image sensor control circuit 124, strobe control circuit 125, shutter control circuit 126, image processing circuit 127, display circuit 128, operation switch detection circuit 129, a power supply circuit 130, and communication circuit 131 are connected to this body CPU 121. Input and output of various signals is carried out between these various circuits and the body CPU 121.

The body CPU 121 collectively controls the entire camera in accordance with programs etc. that are stored in the flash ROM 122. Also, communication is possible with the lens CPU 221 by means of a camera body communication circuit 131 and a lens communication circuit 229, with control instructions being output and lens information such as lens position of the focusing lens 203 being acquired.

The flash ROM 122 is an electrically rewritable non-volatile memory, and stores programs to be executed by the body CPU 121, as was described previously, and also stores various adjustment values etc. Memory other than flash ROM may also be adopted as long as it is non-volatile memory. The RAM 123 is an electrically rewritable volatile memory, such as DRAM (dynamic random access memory) or SDRAM (synchronous DRAM), and temporarily stores various information for processing in the body CPU 121.

The image sensor control circuit 124 executes imaging operations at the image sensor 103 in order to convert a subject image into image signals, at the time of executing processing operations that require image data, such as live view display, AE, AF, exposure at the time of shooting etc. As imaging operations, charge storage control and image signal readout etc. are carried out for the image sensor 103.

The strobe control circuit 125 is connected to the strobe unit 106, and carries out charging and emission control of the strobe unit 106. The strobe control circuit 125 carries out emission amount control so as to achieve optimum exposure based on lens position information of the focusing lens 203 that has been acquired from the lens CPU 221, for example. The shutter control circuit 126 is connected to the focal plane shutter 104, and carries out opening and closing control of the focal plane shutter 104 based on a shutter speed signal from the body CPU 121.

The image processing circuit 127 applies image processing such as A/D conversion and filter processing to image signals that have been output from the image sensor 103. Also, in applying image processing, image processing for live view display is carried out, and live view display is performed on the display monitor 105 based on the processed image signals. Image processing of a taken image for storage is also carried out, and this processed image data is stored in a storage medium (not shown).

Also, the image processing circuit 127 carries out extraction processing by subjecting high-frequency components from image signals within a focus detection region to high pass filter processing, and calculates an AF evaluation value. In this embodiment, well-known contrast AF has been adopted in the focus detection, where the focusing lens 203 is moved and the position at which the AF evaluation value becomes a peak is made a focus position. The focus detection method is not limited to contrast AF, and another method such as phase difference AF may also be adopted.

The image processing circuit 127 is capable of calculating motion vectors for every block, using image data of the previous frame and the current frame. In this case, the image processing circuit 127 has a function as a movement determination section for determining movement amount of the subject.

The display circuit 128 is connected to the display monitor 105, and carries out live view display, playback display of taken images that have been stored in a storage medium, and display of various shooting information such as menu screens.

The operation switch detection circuit 129 is connected to the first release switch 132 linked to the release button 107, and to the second release switch 133 and other detection switches (not shown), and detects operating states of the switches, outputting detection results to the body CPU 121. The other detection switches are a power supply switch that is linked to a power supply button for turning a power supply on and off, a shooting mode switch for switching shooting modes of the camera, a menu switch that is linked to a menu button for displaying menu screens, a playback switch that is linked to a playback button for causing execution of playback display of taken images stored in the storage medium, a mount switch for detecting an attachment state of the interchangeable lens 200, and a movie switch that is linked to a movie button for instructing start and stop of movie shooting, etc.

Setting of various shooting information, such as focusing mode, is carried out through the above-described menu screens. In this embodiment there are two focusing modes set in the menu screens, namely autofocus mode (AF mode) where focusing of the focusing lens 203 is carried out automatically, and manual focus mode (MF mode) where focusing is carried out manually. Focusing mode setting of the camera body 100 may also be carried out using a method other than with the menu screens as in this embodiment, such as setting using dedicated buttons.

The power supply circuit 130 is connected to the battery 108, and performs smoothing and boosting etc. of the power supply voltage to supply power to each of the circuits and each of the members within the camera body 100 and the interchangeable lens 200.

The camera body communication circuit 131 of the camera body has a synchronization signal terminal and a plurality of communication terminals, such as data terminals, provided on a mount section at an outer part of the camera body 100, communication is carried out between the body CPU 121 and the lens CPU 221 by means of the lens communication circuit 229. Communication between the camera body communication circuit 131 of the camera body and the lens communication circuit 229 is carried out by asynchronous communication when the body and the detachable lens are initially attached, but after acquiring information on the interchangeable lens at the camera body side communication is carried out using synchronous communication provided that the attached interchangeable lens 200 is capable of synchronous communication.

The lens CPU 221 is provided within the lens control circuit 201, and a lens drive circuit 222, lens position detection circuit 223, MF ring position detection circuit 224, MF position detection circuit 225, index position detection circuit 226, aperture drive circuit 227, RAM 228, and communication circuit 229 are connected to this lens CPU 221.

The lens CPU 221 carries out control within the interchangeable lens 200 in accordance with programs and various adjustment values that have been stored in a flash ROM (not shown) connected to the lens CPU 221 that is provided within the interchangeable lens, output signals from the lens position detection circuit 223, MF ring position detection circuit 224, MF position detection circuit 225, and index position detection circuit 226, and control instructions from the body CPU 121. Specifically, various drive control is carried out such as lens drive of the focusing lens 203 and aperture drive of the aperture 205. Also, communication with the body CPU 121 is carried out by means of the camera body communication circuit 131 and the lens communication circuit 229, to receive operation instructions from the body CPU 121 and transmit information representing the lens state, such as lens operating state and optical data of the interchangeable lens 200.

The lens drive circuit 222 is configured including an actuator, such as a stepping motor, and a motor driver, and carries out drive control of the focusing lens 203 in the optical axis direction. Also, in the case where focusing is carried out in range focus mode (RF mode), which will be described later, braking (acceleration and deceleration) control of the focusing lens 203 is carried out using synchronization signals for synchronous communication from the camera body 100 as timing signals. Drive control using a so-called wobbling operation where the focusing lens 203 is finely driven in opposite directions, is also possible. This lens drive circuit 222 has a function as a lens drive section for driving the focusing lens 203.

The lens position detection circuit 223 carries out position detection of the focusing lens 203. This lens position detection circuit 223 is constructed including a photo interrupter (PRI) circuit for converting a rotational amount of a drive motor, such as the stepping motor included in the lens drive circuit 222, to a number of pulses. A position detection result from the lens position detection circuit 223 is output as a number of pulses from a reference position such as the infinity end, and this number of pulses represents an absolute position of the focusing lens 203.

The MF ring position detection circuit 224 detects a slide position of the MF ring 204 in the optical axis direction of the interchangeable lens 200. Specifically, the MF ring 204 is capable of sliding to two positions, namely a manual focus operation position (MF position, first position) when it has been slid towards the front of the interchangeable lens 200, and a range focus operation position (RF position, second position) when it has been slid towards the rear of the interchangeable lens 200. The MF ring position detection circuit 224 detects whether or not the MF ring 204 is at the first position or at the second position. This MF ring position detection circuit 224 functions as a slide position detection section for detecting whether the ring member is at a first position or a second position, when the ring member has been subjected to slide movement in the optical axis direction. This position detection mechanism will be described later using FIG. 5.

The MF position detection circuit 225 is constructed including a PI circuit, and detects an amount of relative positional change of the MF ring 204 in the rotational direction about the optical axis center of the interchangeable lens 200. Specifically, when the position of the MF ring 204 that has been detected by the MF ring position detection circuit 224 is the manual focus operation position (MF position, first position), rotation direction, rotation amount, rotational speed, etc. of the MF ring 204 can be detected based on pulse signals output from the PI circuit. A detection timer used in rotation detection of this MF ring 204 is a common built-in timer within the lens CPU 221. The structure of the photo interrupter of the PI circuit will be described later using FIG. 5.

The index detection circuit 226 is constructed including a linear encoder and an A/D conversion circuit etc., and carries out detection of range index corresponding to drive target position of the focusing lens 203. Specifically, when position of the MF ring 204 that has been detected by the MF ring position detection circuit 224 is the range focus position (RF position, the second position), detection of range index position corresponding to a drive target position, set at a rotational direction position of the MF ring 204 around the optical axis center of the interchangeable lens 200, is carried out based on a result of A/D conversion of an encoder value. That is, the index detection circuit 226 carries out detection of absolute distance (preset distance) that has been set by the MF ring 204. The index position detection circuit 226 functions as a rotation position detection section for outputting a preset distance that has been set by a rotation operation as a digital signal, when the ring member is at the second position.

A mode for controlling the focusing lens 203 so as to be equivalent to a distance (preset distance) determined by the absolute position of the MF ring 204 in the rotational direction, when there has been a slide operation of the MF ring 204 to the RF position (second position), is referred to as range focus mode (RF mode). As a timing signal for a detection timer used when reading this encoder value, use is made of a lens communication synchronization signal for carrying out synchronous communication between the camera body 100 and the interchangeable lens 200. The structure of one example of a detection mechanism of the index detection circuit 226 that uses a linear encoder will described later using FIG. 6.

The aperture drive circuit 227 is configured including an actuator, such as a stepping motor, and a motor driver, and carries out opening operation control of the aperture 205 in accordance with an aperture value from the lens CPU 221.

The RAM 228 is a volatile memory for temporarily storing various information used by the lens CPU 221.

The lens communication circuit 229 has a synchronization signal terminal, and a plurality of communication terminals, such as data terminals, provided on a mount section at an outer part of the interchangeable lens 200, and engages with communication connection terminals of the camera body communication circuit 131 to carryout communication with the camera body. Control commands for the focusing lens 203 and the aperture 205 from the body CPU 221 are received via this lens communication circuit 229, and lens state information such as optical data, lens position information, and operating state are transmitted to the body CPU 221.

The camera control circuit 101 and the lens control circuit 201 function as a control section by controlling the camera together. Specifically, they function as a control section to make drive speed of the focusing lens 203, that is driven by the lens drive section, different for when shooting a movie and when in shooting standby, when the ring member (MF ring 204) has been subjected to slide movement between the first position and the second position. Also, drive speed of the focusing lens 203 during shooting standby (during live view display) is made faster than the drive speed during movie shooting. Also, this drive speed is controlled in accordance with movement of the subject. This speed switching will be described later using the flowcharts shown in FIG. 17 and FIG. 18.

Further, the control section controls the focus position of the focusing lens 203 based on a digital signal representing a preset distance, when the ring member has been subjected to slide movement from the first position to the second position.

As a further function of the control section, when the ring member has been subjected to a slide operation between the first position and the second position, the photographing lens is moved at a first speed or a second speedup to a distance corresponding to an operation position.

Figure 3:
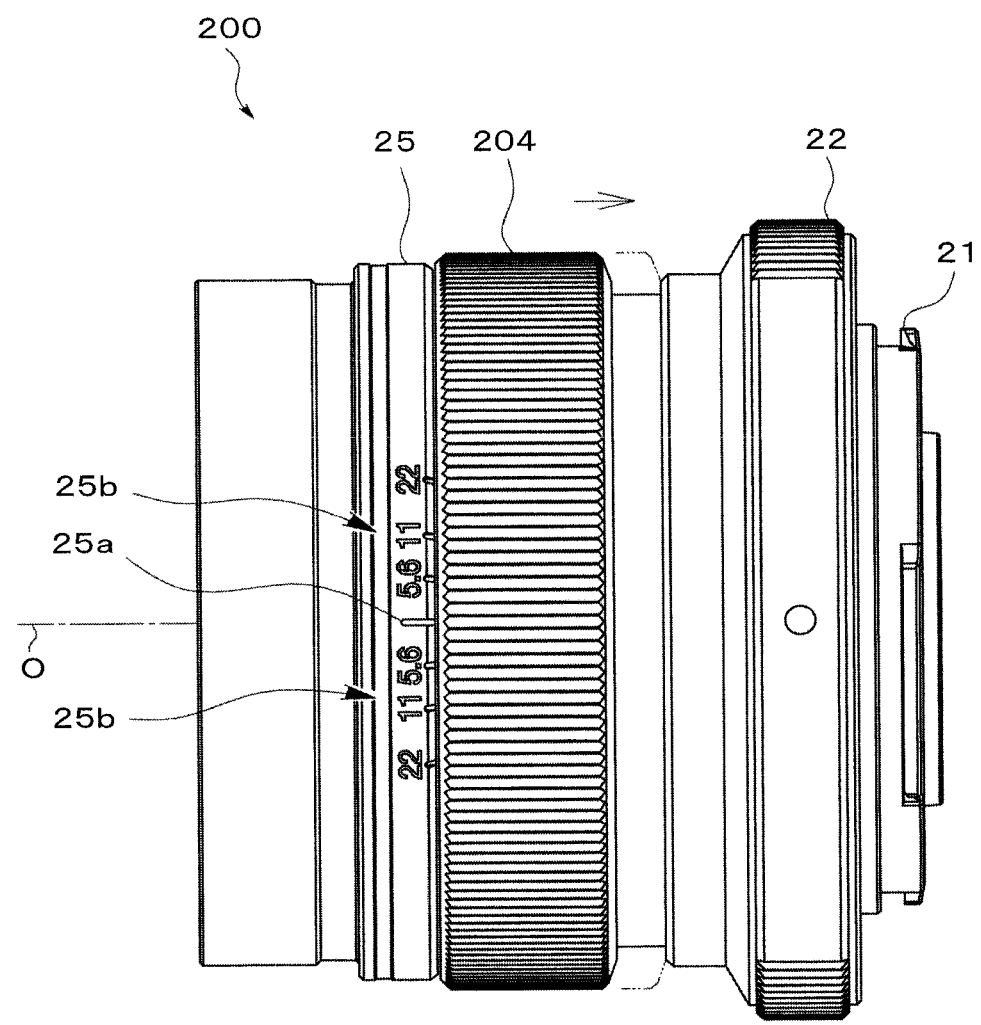
FIG. 3 is a plan view of a lens barrel of a camera of one embodiment of the present invention, in a state where an MF ring is positioned at a first position.
Figure 4:
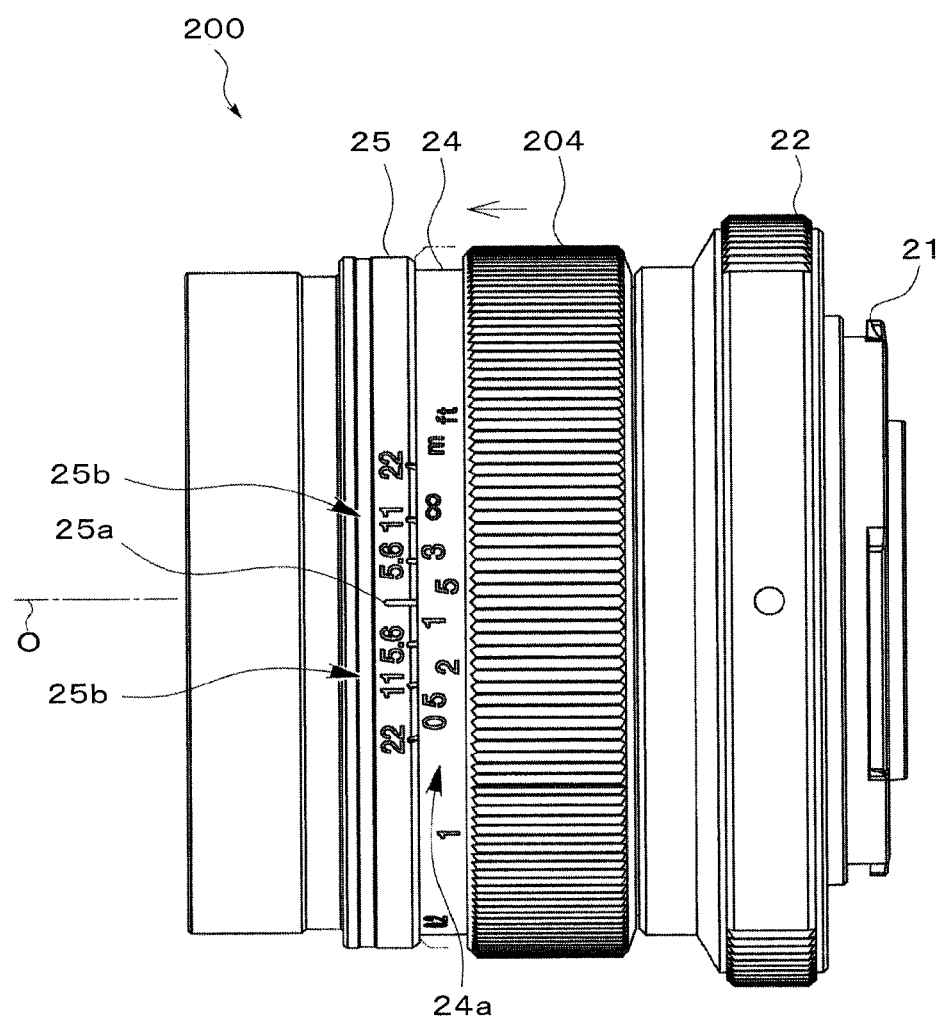
FIG. 4 is a plan view of a lens barrel of a camera of one embodiment of the present invention, in a state where an MF ring is positioned at a second position.

Next, slide operation of the MF ring 204 to the first position and the second position will be described using FIG. 3 and FIG. 4. FIG. 3 shows the case where the MF ring 204 is at the first position, and FIG. 4 shows the case where the MF ring 204 is at the second position.

A bayonet section 21 is provided on the rear of the interchangeable lens 200. This bayonet section 21 is capable of attaching the interchangeable lens 200 to the camera body 100 by engaging with a bayonet section on the camera body 100. A base 22 is integrally formed with the bayonet section 21, and if the bayonet section 21 is attached to the camera body 100 it is fixed to the camera body 100.

The MF ring 204 has a substantially cylindrical shape arranged capable of rotation about an optical axis O, and capable of reciprocal movement in the optical axis O direction, at an outer peripheral section of a lens barrel of the interchangeable lens 200. The MF ring 204 is exposed on the outer periphery of the lens barrel, and is arranged so as to be held by a photographer's fingers. It is also possible to have a structure where only a part of the MF ring 204 is exposed on the outer periphery.

An index display frame 25 is part of an outer member of the lens barrel, and has its position fixed with respect to the base section 22. The index display frame 25 is arranged further to the front than the MF ring 204, even if the MF ring 204 is at the first position (MF position). An index 25a and a subject depth index 25b are displayed in this index display frame 25. The index 25a shows a reference index of a distance scale 24a provided on a distance display ring 24, which will be described later, while the subject depth index 25b shows subject depth corresponding to aperture value of the aperture 205 with respect to the distance scale 24a.

In the state shown in FIG. 3, if the MF ring 204 is subjected to a slide movement along the optical axis O to the rearward second position (imaging side, camera body side), then the distance display ring 24 is exposed, as shown in FIG. 4. The distance display ring 24 is a substantially cylindrical member arranged at an inner side of the MF ring 204, and when the MF ring 204 is at the first position does not move integrally with the MF ring 204. However, if the MF ring 204 is moved to the second position, the distance display ring 24 is capable of rotating integrally with the MF ring 204 about the optical axis O.

As shown in FIG. 4, the distance scale 24a showing the distance at which the focal length lens 203 is focused (in-focus distance) is shown on the outer peripheral surface of the distance display ring 24. The distance scale 24a has numerical values arrayed along a circumferential direction, representing distance from the minimum in-focus distance to infinity. By rotating the distance display ring 24 around the optical axis O with respect to the index display frame 25, the numerical value of the distance scale 24a pointed to by the index 25a is changed.

The distance display ring 24 is has a restricted range of rotation about the optical axis O, and is only capable of rotating within the distance range indicated by the index 25a. Accordingly, the distance scale 24a displays numerical values of distance from the minimum in focus distance to infinity, with respect to the index 25a.

In this manner, with this embodiment, when the MF ring 204 is positioned at the first position (MF position), as shown in FIG. 3, the distance scale 24a of the distance display ring 24 is in a state where it can not be seen from the outside of the lens barrel. On the other hand, when the MF ring 204 is positioned at the second position (RF position), as shown in FIG. 4, the distance scale 24a is in a state where it can be seen from the outside of the lens barrel.

The distance display ring 24 is constructed so as to rotate about the optical axis O together with the MF ring 204 only when the MF ring 204 is at the second position, as was described previously, and when the MF ring 204 is at the first position (MF position) the MF ring 204 is capable of rotation independently of the distance display ring 24.

Figure 5:
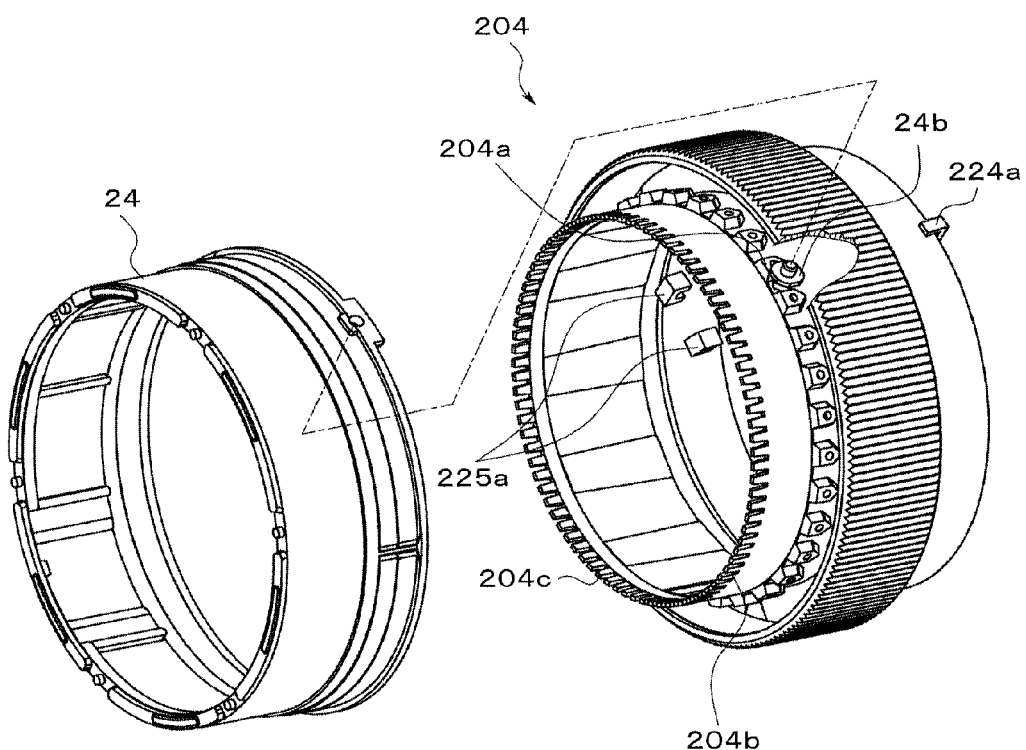
FIG. 5 is a perspective view for describing engagement of an MF ring and a distance display ring, with the camera of one embodiment of the present invention.

Specifically, as shown in FIG. 5, an engagement pin 24b projects radially inward at an inner part of the distance display ring 24. Also, a plurality of engagement sections 204a are arranged on an inner cylindrical section 204b of the MF ring 204. When the MF ring 204 is at the first position (MF position), the engagement pin 24b is further to the rear than the engagement sections 204a of the MF ring 204, and even if the MF ring 204 is rotated around the optical axis O it is at a position that does not interfere with the engagement sections 204a. Also, when the MF ring 204 is at the second position (RF position), the engagement pin 24b is arranged as a position that overlaps the engagement sections 204a. Accordingly, when the MF ring 204 is at the second position the distance display ring 24 rotates about the optical axis O together with the MF ring 204, while when the MF ring 204 is at the first position, the distance display ring 24 remains stationary without rotating even if the MF ring 204 is rotated about the optical axis O.

Next, the structure of the detection mechanism for the MF ring position detection circuit 224 and the MF position detection circuit 225 will be described using FIG. 5. The MF ring position detection circuit 224 has a photo interrupter section 224a. This photo interrupter section 224a is fixed to the base section 22 or to a member integrally constituting the base section 22, and when the MF ring 204 is positioned at the second position the photo interrupter section 224a is at a position where at least a part of the MF ring 204 enters into a detection range, and when the MF ring 204 is positioned at the first position the photo interrupter section 224a is provided at a position outside the detection range.

With this embodiment, position of the MF ring 204 is detected by the photo interrupter section 224a, but this detection is not limited to a photo interrupter, and another detection sensor may be adopted as long as it is capable of the detecting the position of the MF ring 204. For example, it is possible to use a magnetic sensor or switch etc.

The MF position detection circuit 225 has a pair of photo interrupters 225a. Also, a plurality of slits holes 204c provided a specified distance apart are provided in a circumferential direction of an inner cylinder 204b that rotates integrally with the MF ring 204. The pair of photo interrupters 225a are provided within a detection range of the slit holes 204c when the MF ring 204 is at the first position (MF position). Rotational conditions such as the rotation direction, rotation amount, and rotation speed of the MF ring 204 about the optical axis O are then detected based on output signals from the pair of photo interrupters 225a.

The detection sensor of the MF position detection circuit 225 can also be a magnetic rotary encoder or the like, for example, as long as it is capable of detecting rotation of the MF ring 204 when the MF ring 204 is at the first position (MF position).

Figure 6:
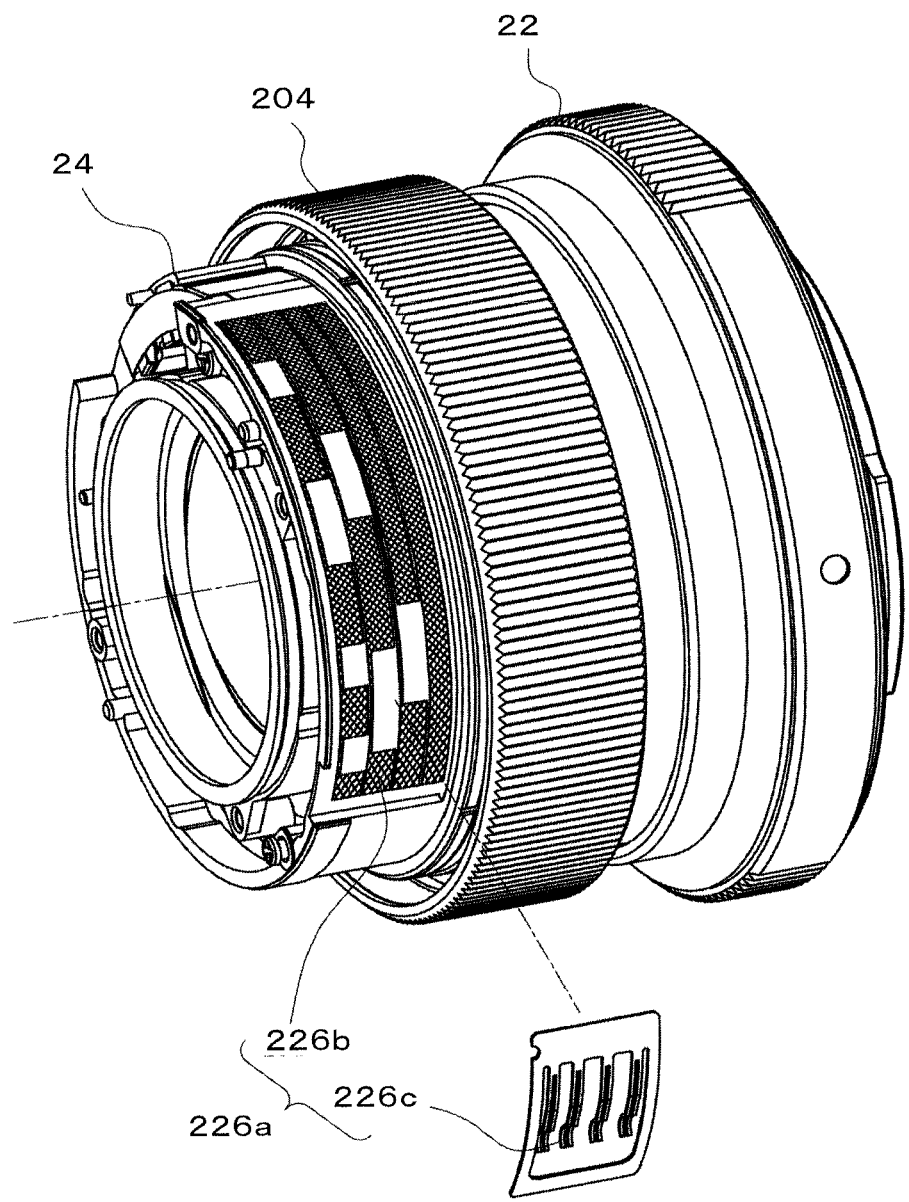
FIG. 6 is a perspective view showing the structure of an index position detection section of a camera of one embodiment of the present invention.

Next, the detecting mechanism of the index position detection circuit 226 will be described using FIG. 6. The index position detection circuit 226 has an encoder section 226a. This encoder section 226a detects absolute rotation position (preset position) about the optical axis O, with respect to the base section 22 of the distance display ring 24. The encoder section 226a comprises a plurality of code patterns 226b of a specified number of bits formed from conductive bodies, and a contact point section 226c formed from conductive bodies that slide on the code patterns 226b.

The code patterns 226b are arranged on the outer peripheral part of the distance display ring 24, while the contact point section 226c is arranged on a fixed frame formed integrally with the base section 22. If the distance display ring 24 is rotated about the optical axis O, the positions of the code patterns 226b connecting to the contact point section 226c vary in accordance with the rotation position. The index position detection circuit 226 detects changes in connection state between the code patterns 226b and the contact point section 226c, and detects absolute rotational position (preset position) of the MF ring 204 about the optical axis O. Accordingly, it is possible to detect a preset distance corresponding to the preset position using the encoder section 226, and this preset distance is a digital signal of a specified number of bits, and becomes a discrete value.

The index position detection circuit 226 may also adopt a structure other than a contact point type encoder, as long as it is capable of detecting absolute rotational position about the optical axis O, with respect to the base section 22. For example, it is also possible to have an optical or magnetic rotary encoder for absolute position detection, and it is also possible to have a potentiometer whose resistance varies in accordance with rotational position of the distance display ring 24 about the optical axis O. Also, in this embodiment, in the detection of absolute position, lens communication synchronization signals at the time of synchronous communication between the camera body 100 and the interchangeable lens 200 are used as detection timing signals in order to carry out detection at high-speed.

Figure 7:
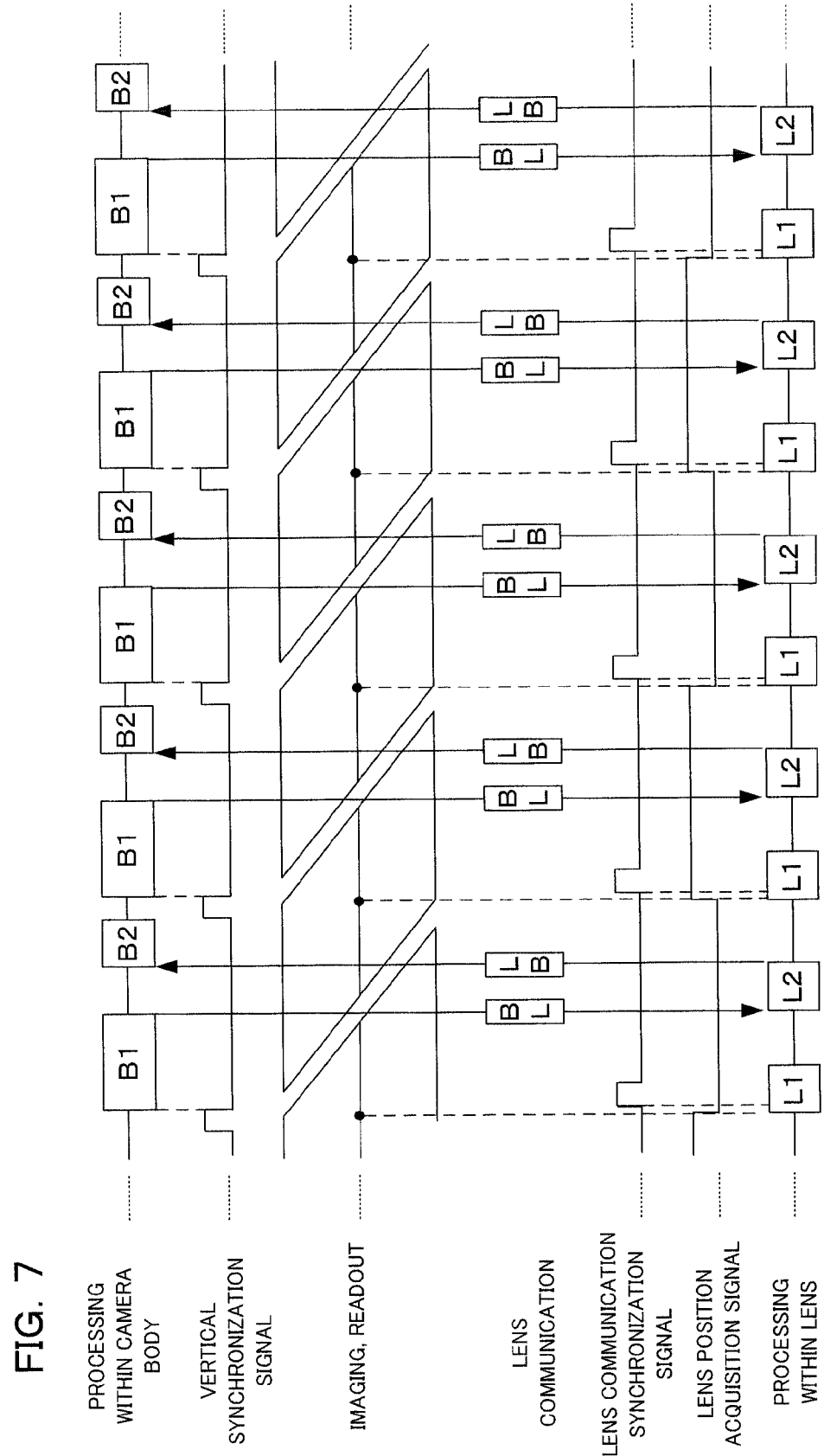
FIG. 7 is a timing chart showing one example of synchronous communication between an interchangeable lens and the camera body, in a camera of one embodiment of the present invention.

Next, one example of synchronous communication that is performed between the camera body 100 and the interchangeable lens 200 will be described using FIG. 7. In FIG. 7, the horizontal axis represents the flow of time, while the vertical axis represents respective processing content and timing. In processing within the camera body, in process B1 display of a live view image, and calculation of an AF evaluation value, are carried out using image data that was acquired in the previous frame. Also, in process B2 AF calculations and various setting changes etc. are carried out based on lens state data that was acquired from lens state communication.

A vertical synchronization signal is a signal that is output in correspondence with each frame. With imaging and readout, a subject image is formed on the image sensor 103, and image data of this formed image is read out. The imaging and readout have a rhombus shape in FIG. 7, which is because in this embodiment, at the time of acquiring a live view image a rolling shutter is adopted, and imaging and readout are carried out sequentially every pixel line.

With the communication BL of the lens communication, a lens state data request command is transmitted from the camera body 100 to the interchangeable lens 200, and this command requests transmission of data representing the lens state of the interchangeable lens 200 to the camera body 100. Also in the communication BL, the interchangeable lens 200 transmits data representing the lens state of the interchangeable lens 200 to the camera body 100 in response to the lens state data request command.

A lens communication synchronization signal is generated in response to a vertical synchronization signal in the camera body 100, and this lens communication synchronization signals is output to the interchangeable lens 200 from a synchronization signal terminal of the camera body communication circuit 131. A lens position acquisition signal changes state at a predetermined time, for example, with the example shown in FIG. 7, at a time point after a time point substantially at the central point time of a charge accumulation time of the image sensor 103.

Also, processing L1 within the interchangeable lens 200 is processing to acquire position information of the focusing lens 203 at a time where the lens position acquisition signal changes state, and detect operating state of the MF ring 204 at a time when the lens communication synchronization signal is received. Also, processing L2 is processing to transmit position information of the focusing lens 203 and lens state data such as operating state of the MF ring 204, in response to a lens state data request command that has been received from the camera body 100.

As shown in the timing chart of FIG. 7, with the synchronous communication of this embodiment, processing B1 within the camera body 100 is executed in synchronization with the vertical synchronization signal, and a lens communication synchronization signal is transmitted to the interchangeable lens 200 in synchronization with the vertical synchronization signal.

Once processing B1 within the camera body 100 has been processed, a lens state data request command is transmitted to the interchangeable lens 200 by communication BL. Once the interchangeable lens 200 has received the lens state data request command, the lens state is detected and lens state data is transmitted by communication LB. The camera body 100 receives the lens state data and then executes processing B2.

Also, within the interchangeable lens 200, processing L1 for acquiring lens position is executed in synchronization with a lens position acquisition signal. This lens position acquisition signal is generated at a predetermined time, and with the example shown in FIG. 7, as was described previously, at a time point after half of a charge accumulation time has elapsed at the screen center of the image sensor 103. The interchangeable lens 200 acquires position information of the focusing lens 203 using the lens position detection circuit 223, at the time when the lens position acquisition signal changes state. These synchronous communications are all executed in synchronization with the lens communication synchronization signal.

Next the focusing modes of this embodiment will be described. In this embodiment, three focusing modes have been implemented, namely auto focus mode (AF mode), manual focus mode (MF mode) and range focus mode (RF mode). AF mode is carrying out automatic focusing of the focusing lens 203 using a climbing method that uses contrast AF, based on image data from the image sensor 103. MF mode is carrying out focusing, when the MF ring 204 is at the first position (MF position), by manually rotating the MF ring 204 and moving the focusing lens 203 in accordance with the rotation state at this time. AF mode and MF mode are set on the camera body 100 on menu screens, for example, as was described previously.

Differing from AF mode and MF mode, RF mode involves carrying out distance setting by rotating the MF ring 204, when the MF ring 204 is at the second position, and aligning the distance scale 24a of the distance display ring 24 with the index 25a, and then carrying out focus to this set distance. After the distance has been set beforehand in RF mode, if the power supply is turned off and then after that the power supply is turned on in RF mode, it is possible to focus to the distance that was set beforehand. For example, as shown in FIG. 8A, when the photographer 301 is strolling through a town etc., if a distance has been set before hand in RF mode, then as shown in FIG. 8B it is possible to rapidly take a shot even if a subject 303 suddenly comes into view.

Also, after distance setting in RF mode, even if MF mode or AF mode are switched to by sliding the MF ring 204 to the first position (MF position), if the MF ring 204 is slid to the second position focusing is immediately carried out to the set distance.

Figure 9:
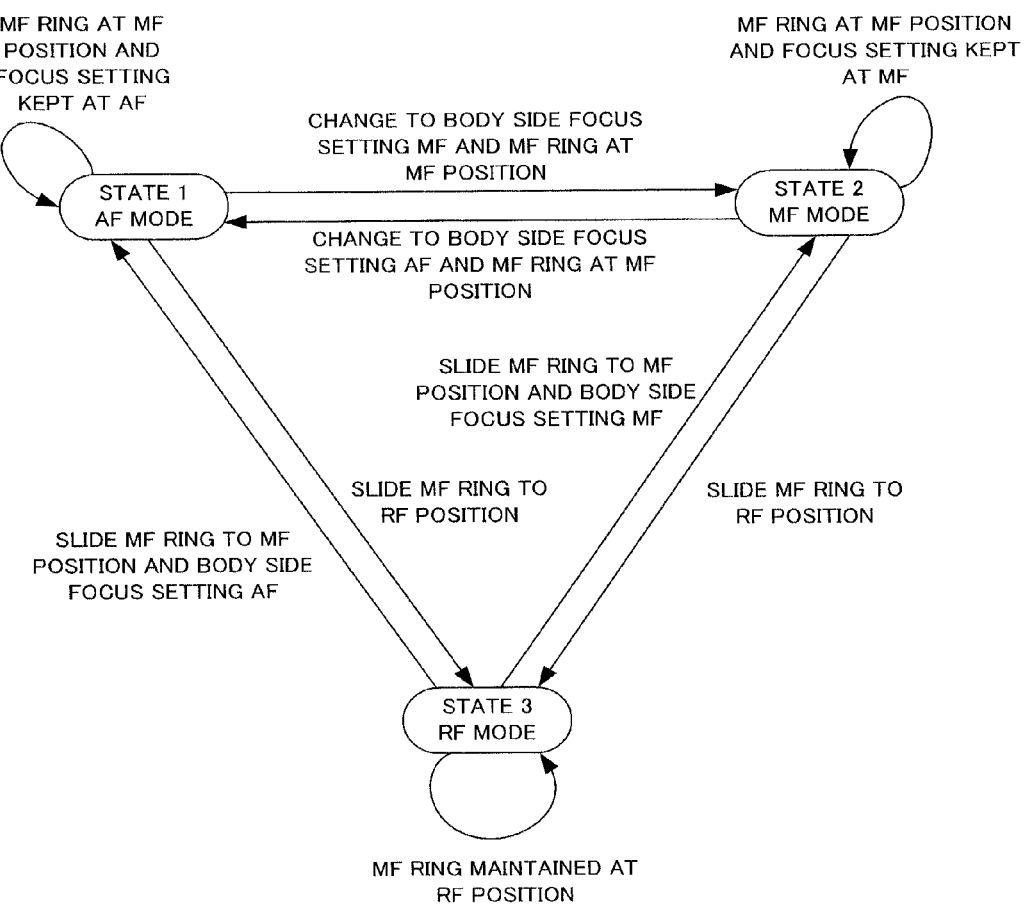
FIG. 9 is a state transition diagram for autofocus (AF) mode, manual focus (MF) mode, and range focus (RF) mode, in a camera of one embodiment of the present invention.

Therefore, with this embodiment, there are 3 modes, namely AF mode, MF mode, and RF mode, for focusing. Switching of these 3 modes will be described using FIG. 9. In FIG. 9, state 1 is AF mode, state 2 is MF mode, and state 3 is RF mode. Of these states, AF mode and MF mode are set on menu screens of the camera body 100, as was described previously, and RF mode can be set by performing a sliding movement of the MF ring 204 of the interchangeable lens 200 to the second position.

The AF mode of state 1 remains in AF mode if the MF ring 204 is at the MF position (first position) and AF mode is still set as the focusing setting on the menu screen of the camera body 100. The MF mode of state 2 remains in MF mode if the MF ring 204 is at the MF position (first position) and MF mode is still set in the camera body 100.

In switching from AF mode of state 1 to MF mode of state 2, the focusing setting should be changed to MF mode at the camera body 100 with the MF ring 204 kept at the MF position (first position). Conversely, in switching from MF mode to AF mode, the focusing setting should be changed to AF mode with the MF ring 204 kept at the MF position (first position).

In switching from the AF mode of state 1 to the RF mode of state 3, all that is required is a slide operation of the MF ring 204 to the RF position (second position), and it is not necessary to change the focusing setting in the camera body 100. Conversely, in switching from the RF mode of state 3 to the AF mode of state 1, a slide operation of the MF ring 204 to the MF position (first position) is carried out, together with changing of the focusing setting in the camera body 100 to AF mode.

In switching from the MF mode of state 2 to the RF mode of state 3, all that is required is a slide operation of the MF ring 204 to the RF position (second position), and it is not necessary to change the focusing setting in the camera body 100. Conversely, in switching from the RF mode of state 3 to the MF mode of state 2, a slide operation of the MF ring 204 to the MF position (first position) is carried out, together with changing of the focusing setting in the camera body 100 to MF mode.

Figure 10A:
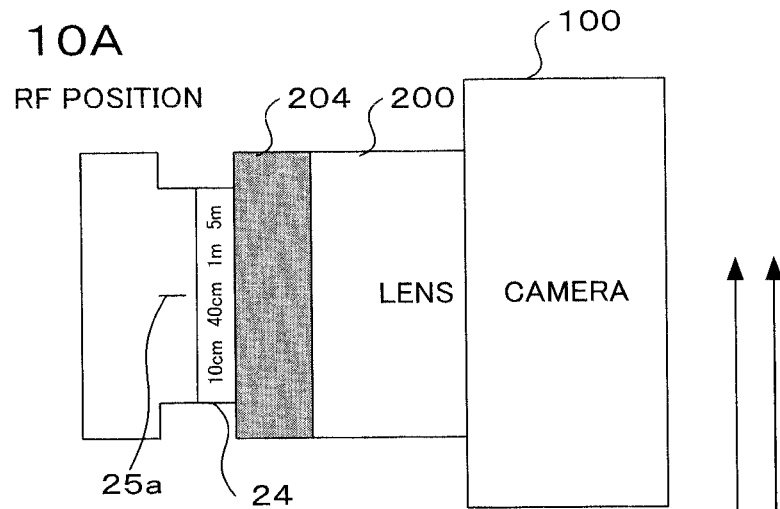
FIG. 10A-FIG. 10C are drawings showing operating states for switching an interchangeable lens between RF mode and MF mode in a camera of one embodiment of the present invention.
Figure 10B:
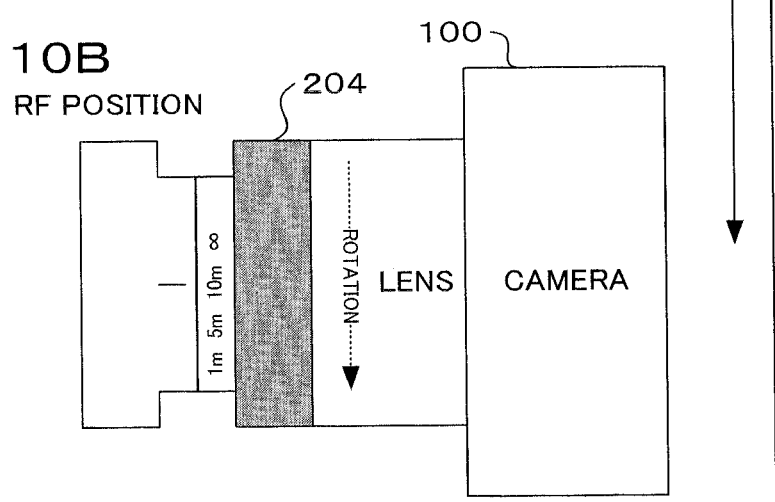
Figure 10C:
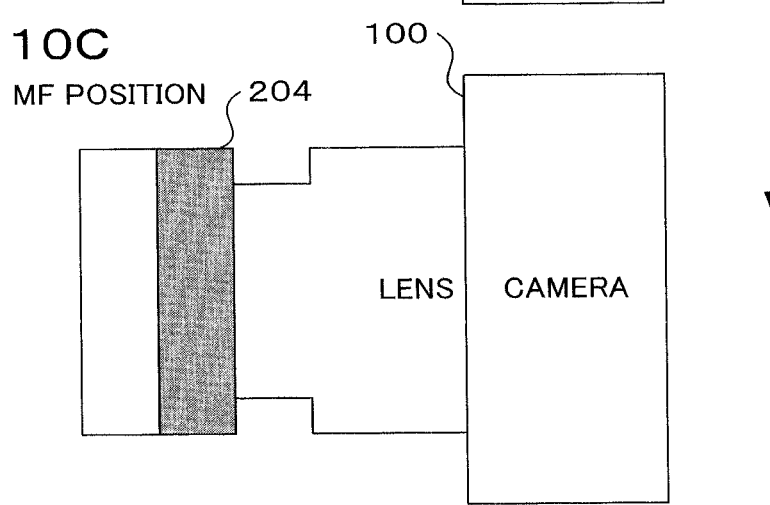
Figure 11A:
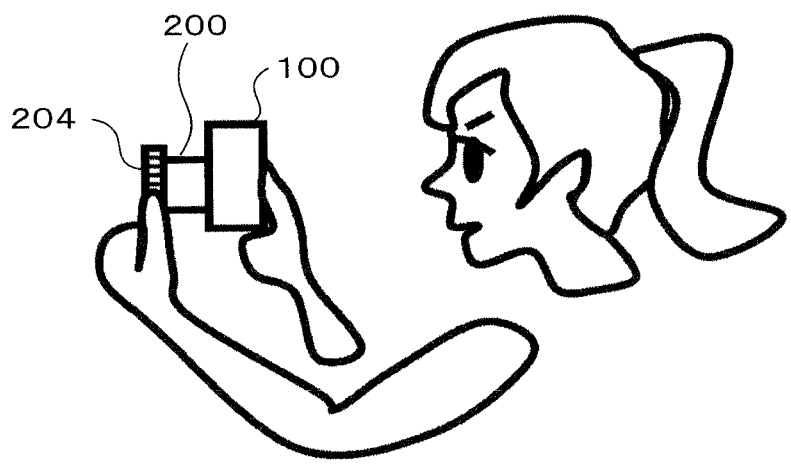
FIG. 11A and FIG. 11B are drawings for describing the operation by a photographer between RF mode and MF mode in a camera of one embodiment of the present invention.
Figure 11B:
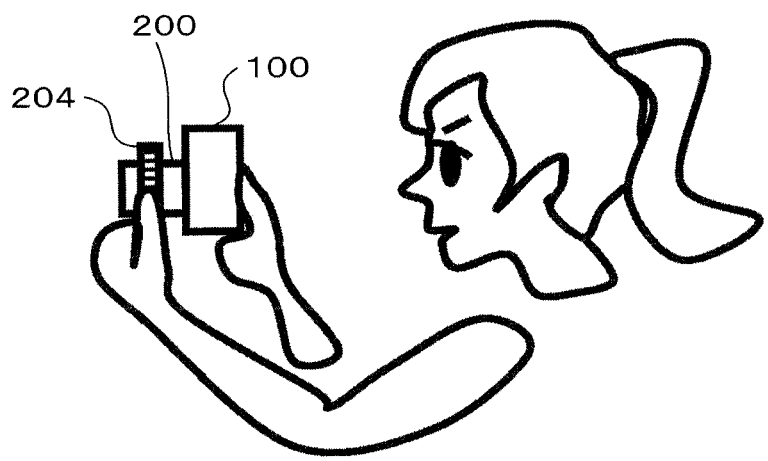

Next, operation at the time of switching between RF mode MF mode will be described using FIG. 10 to FIG. 12. FIG. 10A and FIG. 10B show the state where the MF ring 204 has been slid to the second position (RF position) (refer to FIG. 11B), and FIG. 10C shows the state where the MF ring 204 has been slid to the first position (MF position) (refer to FIG. 11A). As described previously, when the MF ring 204 is at the second position (RF position), then as shown in FIG. 10B, if the MF ring 204 is rotated the distance display ring 24 also rotates together with the MF ring 204. If the distance scale 24a of the distance display ring 24 is aligned with the index 25a, a preset distance is set and lens drive is carried out to this preset distance.

Figure 12A:
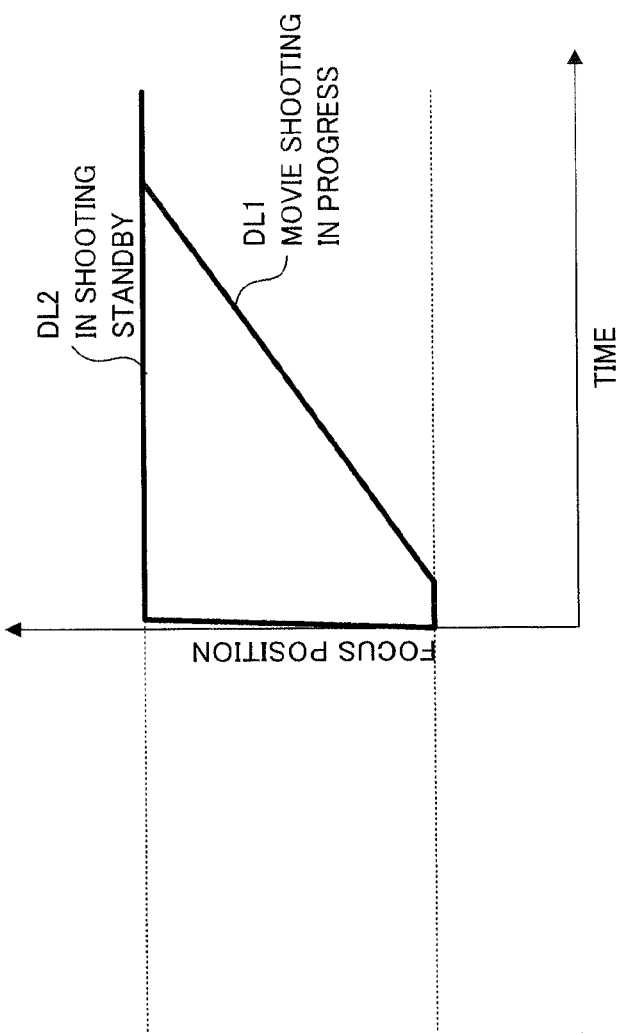
FIG. 12A and FIG. 12B are drawings showing a relationship between MF ring rotational angle and focus position, and camera lens drive speed, with the camera of one embodiment of the present invention.

If the MF ring 204 is rotated to RF mode during movie shooting, then as shown in FIG. 12A the preset distance is changed in steps. The encoder section 226a for detecting preset distance has code data made up of 4 bits, as shown in FIG. 6, which is because the preset distance is made a discrete value in order to divide from the close-up end to the infinity end into 16 parts. If the number of bits of the encoder section 226 is increased, the difference between steps becomes smaller, but the step shape itself is unavoidable.

In RF mode shown in FIG. 10A, if the MF ring 204 is subjected to a slide operation to the first position (MF position), MF mode is switched to (if AF mode is set at the camera body then AF mode it switched to), but the focus position of the focusing lens 203 at this time is the focus position for the previous MF mode in this embodiment. Specifically, when switching from MF mode to RF mode, the focus position of the focusing lens 203 immediately before is stored, and when returning to MF mode the focus position immediately before switching to RF mode is read out and the lenses moved to that position.

In the example shown in FIG. 12A, focus position immediately before switching from MF mode to RF mode is made F1, and focus position corresponding to the preset distance that was set in RF mode is made F2. When switching from RF mode to MF mode, the focus position of the focusing lens 203 is moved from focus position F1 to focus position F2. With this embodiment, drive speed of the focusing lens 203 at this time is switched between when shooting a movie and when in shooting standby.

Figure 12B:
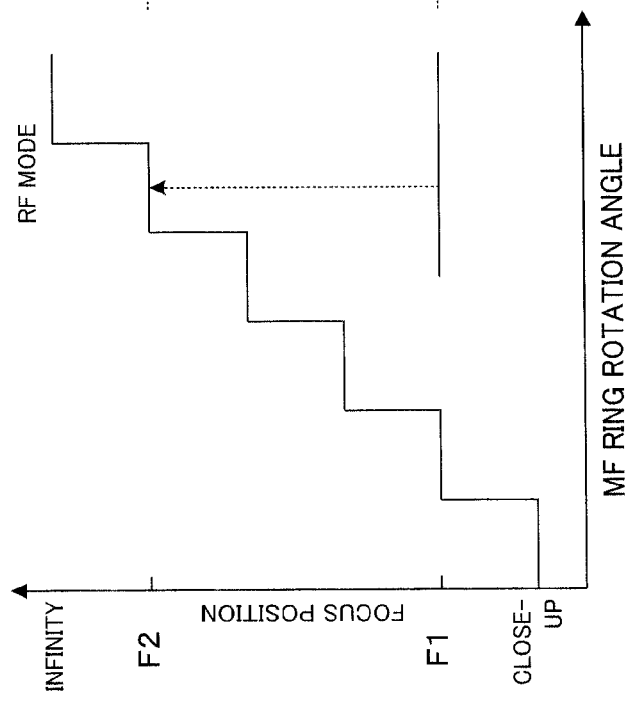

That is, during movie shooting the focusing lens 203 is gradually moved along the drive line DL1 of FIG. 12B at low speed. During movie shooting rapidly changing the focus position is unnatural and so focus is changed gradually over time along the drive line DL2. On the other hand when in shooting standby (live view display) focus position is moved in steps as much as possible, namely very rapidly. In this way it is possible to implement a very agile operation.

Also, conversely, in the case of switching from MF mode to RF mode also, the drive lines DL1 and DL2 of the focusing lens 203 are switched depending on whether movie shooting is in progress or movie standby is in progress. That is, with this embodiment, a preset distance that was set in RF mode is stored before switching to MF mode. If RF mode is returned to from MF mode, with the example shown in FIG. 12A, the focus position of the focusing lens 203 is moved from focus position F2 to focus position F1. At the time of this movement control is carried out along drive lines DL1 and DL2 as shown in FIG. 12B.

Next, a shooting operation of this embodiment will be described using the flowcharts shown in FIG. 13 to FIG. 16. The content of these flowcharts is mainly executed by the body CPU 121 in accordance with programs stored in the flash ROM 122 within the camera body 100, but some content, when RF mode has been set during the flow for MF ring operation detection and operation processing, is mainly executed by the lens CPU 221 in accordance with programs stored in the flash ROM within the interchangeable lens 200.

Figure 13:
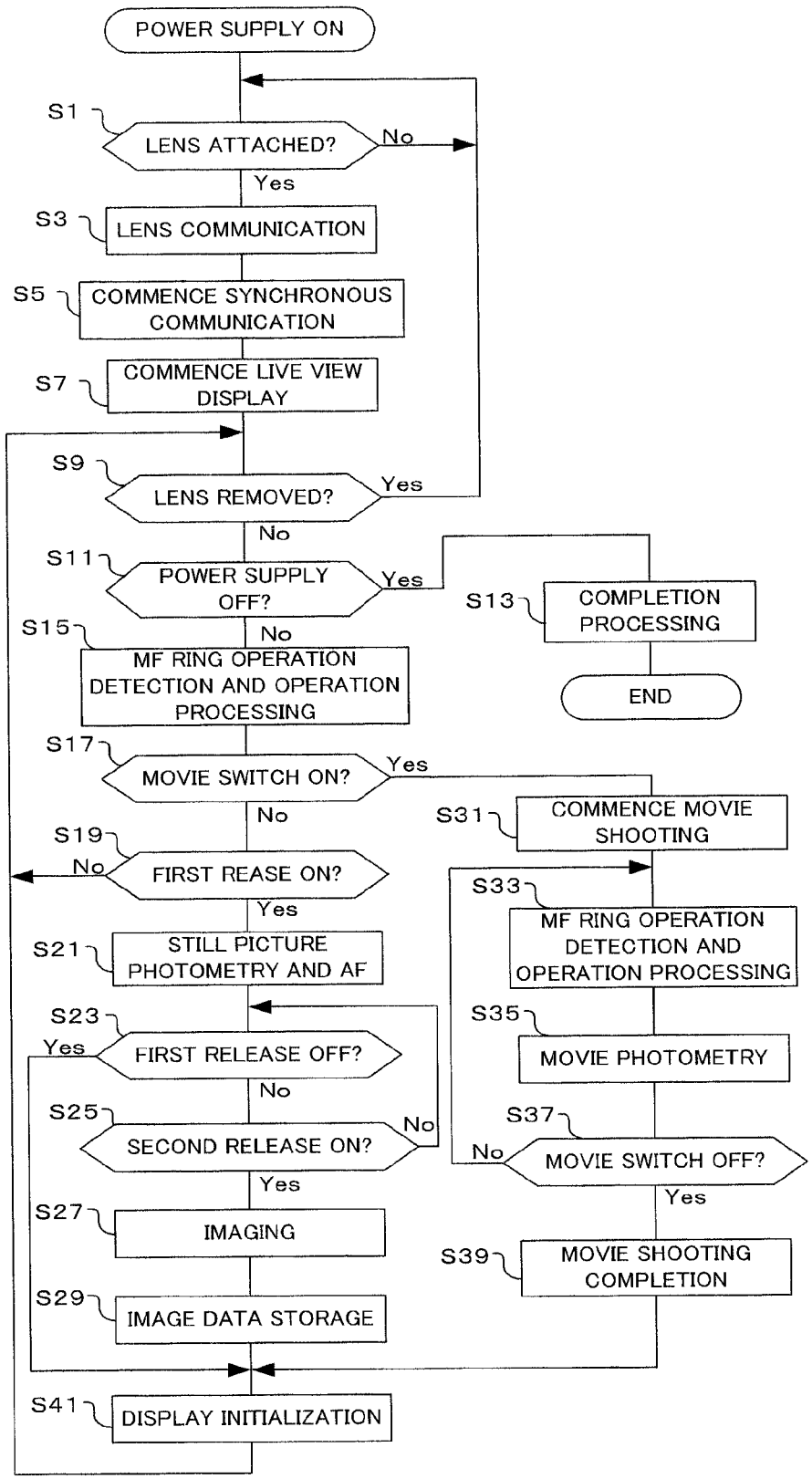
FIG. 13 is a flowchart showing shooting operation of the camera of one embodiment of the present invention.

If the operation switch detection circuit 129 detects that the power supply button has been operated, operations shown in the flowchart of FIG. 13 are commenced. First it is determined whether or not the interchangeable lens 200 is attached (S1). The operation switch detection circuit 129 detects the state of a mount switch or the like, and this determination is carried out based on the result of this detection. If the result of this determination is that the interchangeable lens 200 is not attached, a standby state is entered waiting for attachment of the interchangeable lens 200. In the event that a shooting parameter change operation or playback operation for previously taken images, or setting or focusing mode, are carried out by the photographer during standby, the designated operation is executed.

If the result of determination in step S1 is that the interchangeable lens 200 has been attached to the camera body 100, lens communication is next carried out (S3). Here, asynchronous communication is carried out with the lens CPU 221 by means of the camera body communication circuit 131 and the lens communication circuit 229. Using this asynchronous communication, operating parameters of the focusing lens 203 etc., lens data such as optical data like chromatic aberration data, and information as to whether or not synchronous communication is possible etc. are stored in the RAM 123.

Once the lens communication has been carried out, synchronous communication commences (S5). Here, as was described using FIG. 7, a lens communication synchronization signal is transmitted from the camera body 100 to the interchangeable lens 200, and communication is carried out in synchronization with this signal. For every synchronization period, operating state of the focusing lens 203 etc. and lens state data such as the operating state of the MF ring 204 are acquired, and control operations corresponding to the lens state are executed. Every time the lens communication synchronization signal is output, the camera body acquires data relating to the lens position of the focusing lens 203, whether the MF ring 204 is at the first position or the second position, and information such as aperture value of the aperture 205, and executes control operations corresponding to this information. It is possible to transmit drive direction and drive amount of the focusing lens 203 in order to carry out AF control, and control commands relating to opening amount of the aperture 205, from the camera body 100 also. As a result of the lens communication that was carried out in step S3, synchronous communication is not carried out in the case where an interchangeable lens that is incapable of synchronous communication has been attached.

If synchronous communication has commenced, live view display is next commenced (S7). The body CPU 121 acquires image data by causing the image sensor 103 to be driven every synchronization period by the image sensor control circuit 124, and applies image processing for live view display in the image processing circuit 127. The display circuit 128 commences live view display on the display monitor 105 using image data that has been subjected to processing for live view display.

Once live view display has commenced, it is next determined whether or not the interchangeable lens 200 has been removed (S9). Here, determination of whether or not the interchangeable lens 200 has been removed is carried out based on at least one of communication state of the synchronous communication that was commenced in step S5, and, similarly to step S1, the state of a mount switch. If the result of this determination is that the interchangeable lens 200 has been removed, processing returns to Step S1.

If the result of determination in step S9 is that the interchangeable lens 200 has not been removed, and is attached, it is next determined whether or not the power supply is off (S11). Here, the operation switch detection circuit 129 detects the operating state of the power supply button, and the determination is carried out based on the result of this detection. If the result of this determination is that the power supply is off, termination processing is carried out (S13). Here, processing such as save processing for various data, a reset operation and power supply system disconnect processing etc. is carried out. Once termination processing has been carried out, this processing flow is ended.

If the result of determination in step S11 is that the power supply is not off, MF ring operation detection and operation processing is carried out (S15). Here, operation control and setting processing for the focusing lens 203 is carried out according to the operating state of the MF ring 204. Specifically, in the case where the MF ring 204 is at the second position having been slid to the rear (imaging side) of the interchangeable lens 200, RF mode is executed regardless of whether AF mode has been set or MF mode has been set at the camera body 100. On the other hand, if the MF ring 204 is at the first position having been slid towards the front (subject side) of the interchangeable lens 200, control is carried out in accordance with AF mode or MF mode that has been set at the camera body 100.

Also, when mode switching has been carried out from RF mode to MF mode (AF mode), the drive speed of the focusing lens 203 is switched depending on whether movie shooting is in progress or movie standby is in progress. Details of processing for the MF ring operation detection and operation processing will be described later using FIG. 14 to FIG. 16.

Once MF ring operation detection and operation processing has been carried out, it is next determined whether or not a movie switch is on (S17). Here, the operation switch detection circuit 129 detects the operating state of the movie switch, and the determination is carried out based on the result of this detection.

If the result of determination in step S17 is that the movie switch is off, namely that the camera is in still picture shooting mode, it is then determined whether or not the first release switch is on (S19). The photographer presses the release button down halfway as a preparation step before shooting. Here, the operation switch detection circuit 129 detects the operating state of the first release switch, and determination is carried out based on the result of this detection. If the result of this determination is that the first release switch is off, processing returns to step S9.

If the result of determination in step S19 is that the first release switch is on, still picture photometry and AF are carried out (S21). Here, operations required for shooting, such as photometry for still picture shooting, exposure calculation, AF etc. are executed. Photometry and exposure calculation involves detecting subject brightness based on image data from the image sensor 103, and calculating exposure control values such as shutter speed and aperture value etc. for correct exposure based on this detected subject brightness. Also, in AF for still picture shooting, an AF operation using a so-called climbing method is carried out so that a high-frequency component (AF evaluation value) that has been extracted from image data becomes a maximum. It is also possible to carryout an automatic focusing operation using phase difference AF.

Once photometry and AF have been carried out, it is next determined whether or not the first release switch is off (S23). There will be cases where, after the photographer has pressed the release button down halfway, as shooting preparation, the finger is taken off the release button and the shooting preparation operation is stopped. Here the operation switch detection circuit 129 detects the operating state of the first release switch, and determination is carried out based on the result of this detection. If the result of this determination is that the first release switch is off, processing advances to step S41, which will be described later.

On the other hand, if the result of determination in step S23 is that the first release switch is not off, namely that it is on, it is next determined whether or not the second release switch is on (S25). If the photographer monitors the live view display and has determined composition and shutter timing, the release button is pressed down fully and execution of shooting is instructed. Here the operation switch detection circuit 129 detects the operating state of the second release switch, and determination is carried out based on the result of this detection. If the result of this detection is that the second release switch is off, step S23 is returned to.

If the result of determination in step S25 is that the second release switch is on, there is a transition to a shooting operation. First, imaging is carried out (S27). Here, the body CPU 121 performs communication with the lens CPU 221 based on result of the exposure calculation that was calculated in step S21, instructs a stopping down operation of the aperture 205, and after the stopping down operation is complete controls the image sensor 103 and the focal plane shutter 104 using the image sensor control circuit 124 and the shutter control circuit 126, to carryout a shooting operation. After completion of the shooting operation, image data is acquired by subjecting image signals that have been read out from the image sensor 103 to processing by the image processing circuit 127.

Once imaging has been carried out, storage of image data is next carried out (S29). Here, the body CPU 121 stores image data that was acquired in step S27 in the RAM 123 or and external storage memory such as CompactFlash (registered trademark). Also, based on the acquired image data that taken image is displayed on a display monitor by means of a display circuit 127 for a specified period.

If the result of determination in step S17 was that the movie switch was on, movie shooting mode is entered. First, movie shooting is commenced (S31). The body CPU 121 commences movie shooting by causing the image sensor 103 to be driven every synchronization period by the image sensor control circuit 124. Image signals that were output from the image sensor 103 are subjected to image processing for a movie by the image processing circuit 127, and storage of this movie image data in the RAM 123 or an external storage medium such as CompactFlash (registered trademark) is commenced.

Once movie shooting has commenced, MF ring operation detection and operation processing are carried out (S33). Here, as in step S15, operation control and setting processing for the focusing lens 203 is carried out according to the operating state of the MF ring 204. Also, in the case where AF mode has been set, AF for movie shooting involves carrying out a climbing AF operation, and execution of a so-called wobbling operation where the focusing lens 203 is finely driven back-and-forth by close to an in-focus state, as required.

Once MF ring operation detection and operation processing has been carried out, next movie photometry is carried out (S35). As AE for movie shooting, control is carried out to drive the aperture 205 using the aperture drive circuit 227 in a drive step that is finer than at the time of still picture shooting, so that variation in subject light amount incident on the image sensor 103 becomes uniform.

Once the movie photometry operation has been carried out, it is next determined whether or not the movie switch is off (S37). When the photographers finishes the movie shooting, a finger is taken off the movie button, and so here the operation switch detection circuit 129 detects the operating state of the movie switch, and determination is carried out based on the result of this detection. If the result of determination is that the movie switch is on, step S33 is returned to and movie shooting continues.

If the result of determination in step S37 is that the movie switch is off, movie shooting completion processing is carried out (S39). Here, the body CPU 121 finishes movie shooting by causing the image sensor 103 to stop operation using the image sensor control circuit 124.

Once storage of image data has been carried out in step S29, or movie shooting completion has been carried out in step S39, or if the result of determination in step S23 is that the first release switch is off, display initialization is next carried out (S41). Here, the body CPU 121 carries out clearing of taken image display or display of movie shooting parameters etc. using the display circuit 127, and returns display on the display monitor 105 to live view display. Once display initialization has been carried out, processing returns to step S9.

Next, MF ring operation detection and operation processing in steps S15 and S33 will be described using the flowchart shown in FIG. 14 to FIG. 16. Operations in the flow for MF ring detection and operation processing are executed by the lens CPU 221 under the control of the body CPU 121, but when RF mode is executed main execution is by the lens CPU 221. Also, in this step for initialization at the time of start up and lens attachment, the current lens focus position is set as a focus movement destination. A counter is also initialized to 0.

If the flow for MF ring operation detection and operation processing is entered, first, it is determined whether or not switching in the optical axis direction has been performed (S51). Here, the MF ring position detection circuit 224 determines whether or not the MF ring 204 has been moved by sliding in the optical axis direction to the MF position (first position) or the RF position (second position).

If the result of determination in step S51 is that there has been switching of the MF ring in the optical axis O direction, it is next determined whether or not RF mode is set (S53). Here, determination is based on whether or not the MF ring 204 is at the RF position, detection result of the MF ring position detection circuit 224.

If the result of determination in step S53 is that the MF ring 204 is at the RF position, then when it is RF mode the current focus position is next stored in the flash memory (S59). With this embodiment, when there is switching from MF/AF mode (representing that the camera is in MF mode or AF mode) to RF mode, and MF/AF mode is returned to after that, setting is carried out to the focus position of the focusing lens 203 at the time of the previous MF/AF mode. Therefore, at the time of switching to RF mode, the focus position at the time of MF/AF mode is stored in the flash ROM 122 (or flash ROM within the interchangeable lens 200).

If the current focus position has been stored in the flash memory, next, RF mode is switched to (S61). The fact that RF mode has been set is displayed on the display monitor 105. Focus position instructed at the time of RF mode is then acquired from the interchangeable lens 200 (S63). At the time of RF mode, the MF ring 204 is rotated, and the distance scale 24a aligned with the index 25a is detected by the index position detection circuit 226. This detected absolute distance (preset distance) is acquired from the interchangeable lens 200.

If the result of determination in step S53 is that it is not RF mode, there is a change to MF/AF mode (S55). AF mode and MF mode are set on menu screens of the camera body 100, as was described previously. Since the result of determination in step S53 was that it is not RF mode, either MF mode or AF mode that have been set on the menu screen is set.

Once MF/AF Mode has been changed to, the focus position for the immediately prior MF mode or AF mode is read from the flash memory (S57). Currently MF mode or AF mode is set, before that RF mode was set, and still further before that MF mode or AF mode was set, and so, as was described previously, in step S59 the focus position immediately before switching to RF mode was stored in the flash ROM 122 (or flash ROM within the interchangeable lens 200), and so this focus position is read out If the result of determination in step S51 is that there has not been switching in the optical axis direction, it is next determined whether or not RF mode and range index have been changed (S71, refer to FIG. 15). Since there has been no change to the position of the MF ring 204 in the optical axis direction, in this step it is first determined whether there has been change to the range indexed (namely whether or not the MF ring 204 has been rotated) while RF mode is still maintained. Whether or not the MF ring 204 has been rotated is determined based on the detection result of the MF position detection circuit 225.

If the result of determination in step S71 is that it is RF mode and the range index has changed, next focus position corresponding to the changed range index is acquired from the interchangeable lens 200 (S73). Here, a detection signal is acquired from an encoder section 226a of the index position detection circuit 226.

If the result of determination in step S71 is that it is not RF mode and not range index change, it is next determined whether or not it is MF mode and ring rotation has been performed (S75). Here, MF mode is maintained and it is determined whether or not the MF ring 204 has been rotated. Rotation of the MF ring 204 is determined based on a detection signal of the MF position detection circuit 225.

If the result of determination in step S75 is that it is MF mode and there has been ring rotation, focus position is changed in accordance with rotation direction and rotation amount (S77). Since it is MF mode, focusing of the focusing lens 203 is carried out in accordance with rotational state (rotation direction and rotation amount) of the MF ring 204 that has been detected by the MF position detection circuit 225.

If the result of determination in step S75 is that it is not MF mode and ring rotation, it is next determined whether or not it is AF mode (S79). Here, it is determined whether or not AF mode is set on menu screen of the camera body 100. If the result of this determination is that AF mode is not set, processing advances to step S91, which will be described later. This case may be a case where RF mode or MF mode is set, but there is no rotation of the MF ring 204 etc.

If the result of determination in step S79 is that it is AF mode, an AF evaluation value is next acquired (S81). Here the image processing circuit 127 calculates an AF evaluation value based on image data.

Once an AF evaluation value has been acquired, next the focus position is moved finely by wobbling (S83). As described previously, with a wobbling operation the focusing lens 203 is finely driven in opposite directions. Once the wobbling operation has been carried out, the AF evaluation value is acquired (S84). AF evaluation value is obtained at the position where the focusing lens 203 was finely moved by the wobbling operation.

Once an AF evaluation value has been acquired, the focus position is determined (S85). In the case where AF mode is set, since automatic focusing is always executed the counter is not reset in step S67, and after this step natural movie focusing is executed by finely moving the focus.

Figure 14:
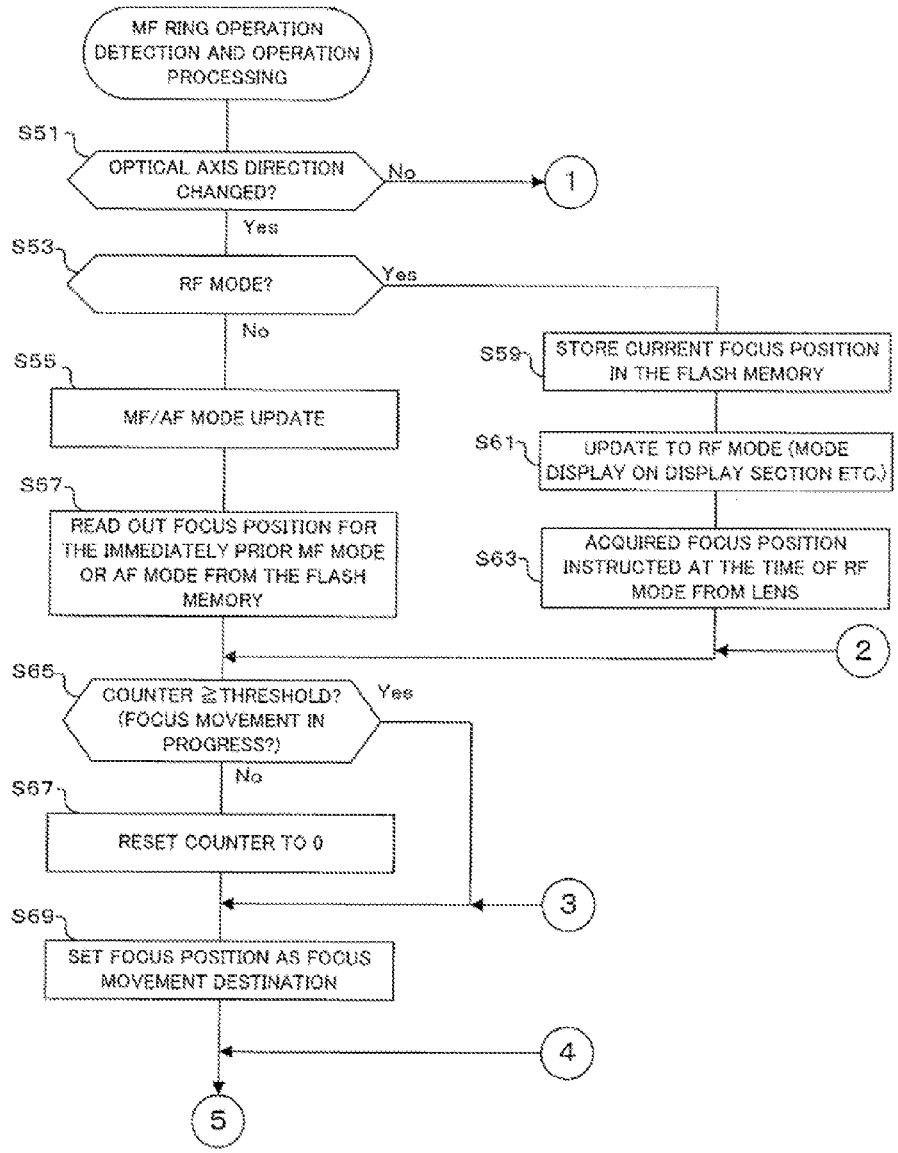
FIG. 14 is a flowchart showing MF ring operation detection and operation processing of the camera of one embodiment of the present invention.
Figure 15:
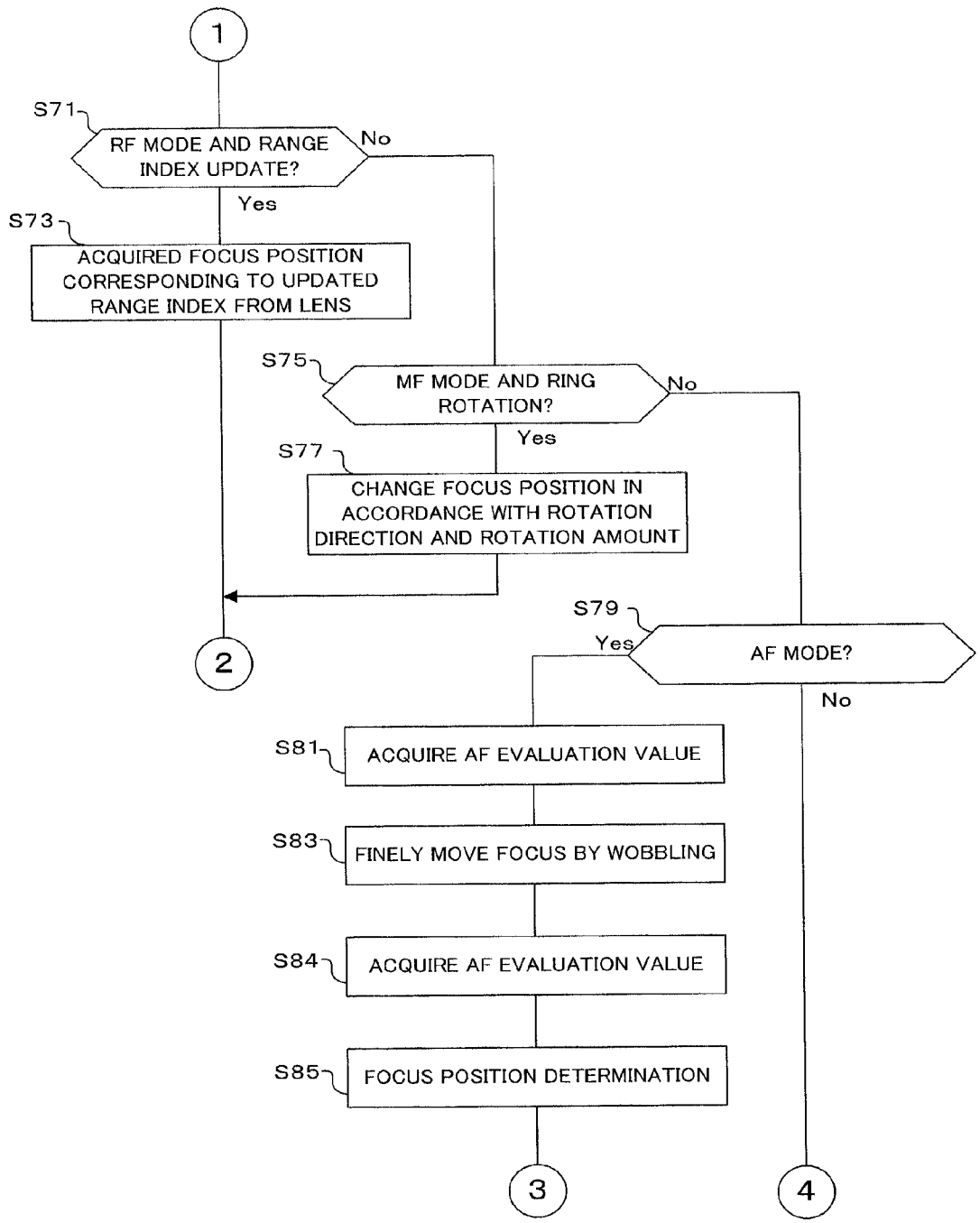
FIG. 15 is a flowchart showing MF ring operation detection and operation processing of the camera of one embodiment of the present invention.

If focus position at the time of the immediately prior MF/AF has been read out in step S57, or if absolute distance (preset distance) instructed in RF mode in step S63 has been acquired, or if changed preset distance has been acquired in step S73, or focusing in MF mode has been carried out in step S77, it is next determined whether or not the counter value is greater than a threshold value (S65 of FIG. 14). This counter represents time from change of the focus position by being incremented in step S101 which will be described later.

If the result of determination in S65 is that the counter has not exceeded the threshold value, the counter is reset to 0 (S67). As a result, if there has been operation of the MF ring 204 and lens movement to achieve focus is in progress, the counter is reset to 0.

Once the counter has been reset to 0 in step S67, or if the result of determination in step S65 was that the counter has exceeded the threshold value, or that focus position has been determined in step S85, the focus position is set as the focus drive destination (S69). Here, a focus position that was read out in step S57, a focus position that was instructed in step S63, a focus position that was acquired in step S73, a focus position that was changed in step S77 or a focus position that was determined in step S85, is set as the focus position the focusing lens 203 will be moved to.

Figure 16:
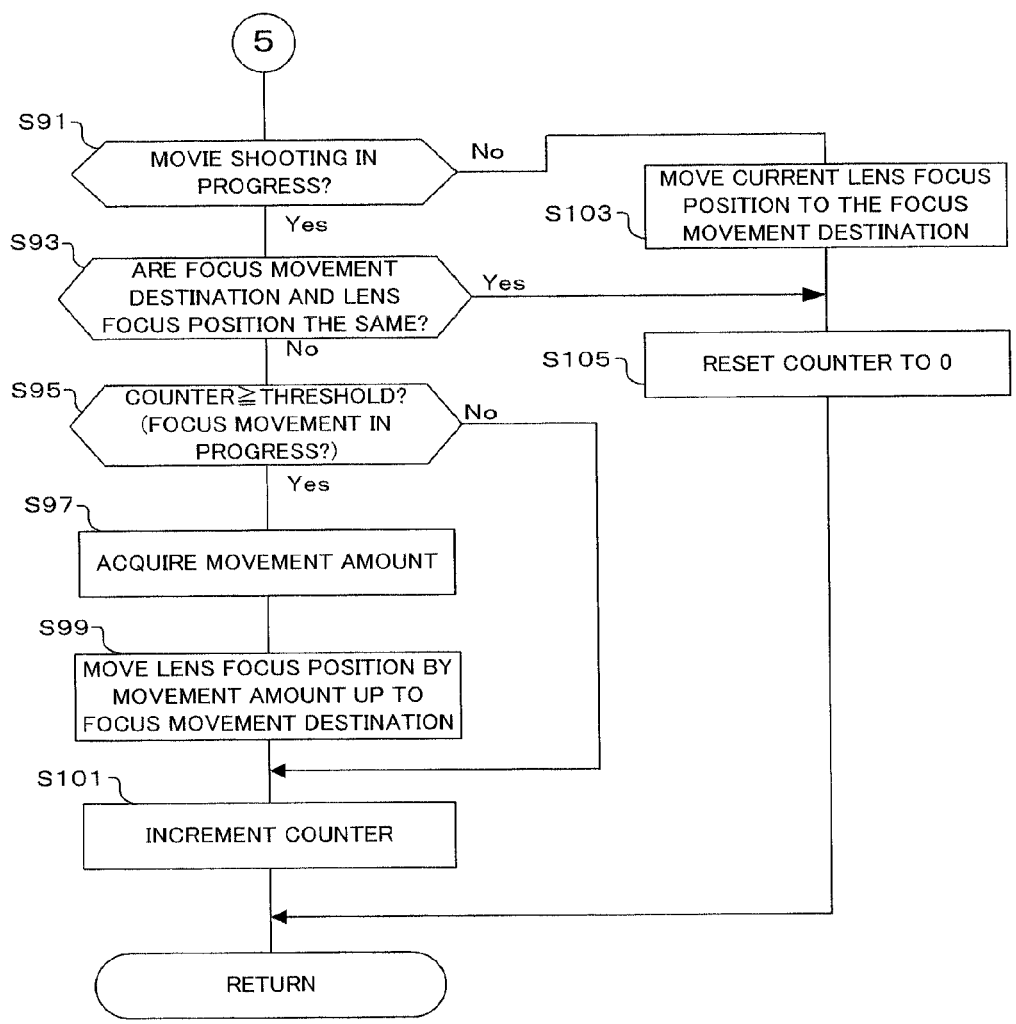
FIG. 16 is a flowchart showing MF ring operation detection and operation processing of the camera of one embodiment of the present invention.

Once the focus position has been set as the focus movement destination in step S69, or if the result of determination in step S79 was that AF mode is not set, it is next determined whether or not movie shooting is in progress (S91 in FIG. 16). Movie shooting commences in previously described step S17 (FIG. 13), and continues until the movie switch is off in step S37.

If the result of determination in step S91 is that movie shooting is not in progress, the current focus position of the lens is moved to the focus movement destination (S103). In previously described step S69, a movement destination focus position is set, and so the lens drive circuit 222 performs drive of the focusing lens 203 to this position while referencing a detection signal from the lens position detection circuit 223. Since movie shooting is not in progress it is the shooting standby state where live view display is being carried out. In this case, movement to the focus movement destination is carried out at high speed along the drive line DL2 shown in FIG. 12B.

If the focusing lens 203 has been moved to the focus movement destination, the counter is reset to 0 (S105). Since the position of the focusing lens 203 has become the same as the focus position, the counter is reset to 0.

If the result of determination in step S91 is that movie shooting is in progress, it is next determined whether or not the focus movement destination and the lens focus position are the same (S93). It is determined whether or not the current focus position of the focusing lens 203 that has been acquired from the lens position detection circuit 223 is the same as the focus position that was set in step S69. If the result of this determination is that they are the same, processing advances to previously described step S105, and the counter is reset to 0.

If the result of determination in step S93 is that The focus movement destination and the lens focus position are not the same, then as in step S65, it is determined whether or not the counter value has exceeded the threshold value (S95). Here, it is determined whether or not focus movement is in progress. As previously described, if the MF ring 204 is operated, the counter is reset in step S67. For example, in the case of a movie having a frame rate of 30 fps, if 3 is set as a threshold value, focus movement will commence 100 ms after a finishing operation. The time until commencement of movement is not limited to 100 ms, and if it ranges from about 50 ms to 300 ms responsiveness is good.

If the result of determination in S95 is that the counter has exceeded the threshold value, it means that focus movement is in progress and so next movement amount acquisition is carried out (S97). For example, focus is moved by microscopic amounts so as to achieve a speed such that it takes three seconds to move from the infinity end to the close-up end. In the case of a 30 fps movie, in the case of a lens that can instruct 300 steps of focus movement from the infinity end to the close-up end, it is possible to move the focus position in 3 steps at a time of 300/30/3. With this embodiment, this subroutine is executed for every frame, and so it is possible to achieve smooth change in the focus position every frame. The movement time is not limited to 3 seconds and can be from 0.5-5 seconds, and is preferably about 2 seconds.

Also, a correlation between the previous frame and the current frame is calculated, and if the entire field of view is moving a lot, the above described steps (for example 3 steps) are multiplied by a large correction coefficient of one or more, the coefficient being larger with larger movement amount. In this way, when the camera is moving a lot the focus movement speed becomes faster. Similarly, in a case where only part of the frame, for example a region in which a face has been detected, is moving, the steps are further multiplied by a large correction coefficient of one or more, being larger as amount of movement becomes larger. In this way, when a main subject is moving a lot the focus movement speed becomes faster. Details of the processing for calculating the number of steps by obtaining this correction efficient will be described later using FIG. 17.

If movement amount has been acquired, the focus position of the lens is moved by the amount of this movement as far as the focus movement destination, within a range that does not exceed the focus movement destination (S99). Here, the lens drive circuit 222 performs drive of the focusing lens 203 based on movement amount that was acquired in step S97, while referencing a detection signal from the lens position detection circuit 223. By carrying out lens drive based on the movement amount that was acquired in step S97, focus is gradually changed over time along the drive line DL1 shown in FIG. 12B.

If lens drive has been carried out in step S99, or if the result of determination in S95 is that the counter has not exceeded the threshold value, the counter is incremented (S101). Here, since the focusing lens 203 has not yet reached the focus position, the counter value is increased.

Once the counter has been incremented in S101, or if the counter was reset to 0 in step S105, the flow for MF ring operation detection and operation processing is complete, and processing returns to the original processing flow.

Next the movement amount acquisition of step S97 will be described using the processing flow shown in FIG. 17. If this movement amount acquisition flow is entered, first, lens information is acquired, a reference movement amount (number of pulses) is calculated, and a correction coefficient characteristic is created (S111). In the communication of step S3 or S5 (refer to FIG. 13), lens information is acquired. Lens information required here is, for example, total number of patterns of the code patterns 226b of the encoder section 226a, and the number of pulses output by the lens position detection circuit 223 of the focusing lens 203 from the close-up end to the infinity end, etc.

Also, a reference movement amount (number of pulses) calculated in step S111 is a movement amount it is possible to move from the infinity end to the close up end in a specified time (for example 2, 3 seconds), as was described previously. The correction coefficient corrects the reference movement amount in accordance with movement speed, in cases where the main subject is moving.

Figure 18:
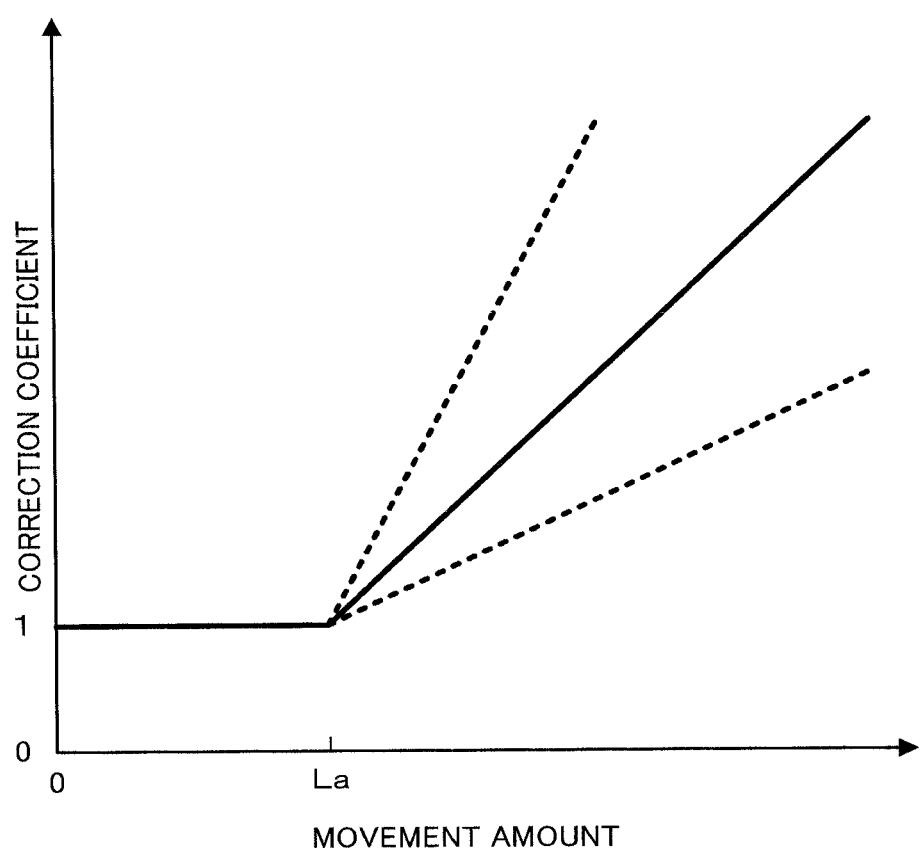
FIG. 18 is a graph showing change in correction coefficient in order to change lens drive speed, for the camera of one embodiment of the present invention.

Examples of correction coefficient are shown in FIG. 18. The correction coefficient is inclined steeply as the number of pulses from the infinity end to the close of end increases, and in the case of RF mode, as the number of bits of the code patterns 226b (gray code) increases. If the number of pulses increases or the number of gray code patterns increases, the number of steps is increased, and with the same inclination of correction coefficient the correction effect will differ depending on the type of lens. The inclination of the correction coefficient is therefore changed so that regardless of the type of interchangeable lens, for the same amount of rotation of the MF ring 204, the focus will move by the same amount. Movement amount on the horizontal axis corresponds to movement amount calculated in steps S115 and S117. The reason that the correction coefficient remains at 1 until the movement amount reaches La is so as not to reflect very small movement. The characteristic for correction coefficient is created based on lens information, or selected from a correction coefficient table that has been prepared in advance.

Continuing on, motion vectors for the previous frame and the current frame are calculated (S113). Here, the image processing circuit 127 divides an image into a plurality of blocks based on image data from the image sensor 103, and motion vectors for the previous frame and the current frame are calculated for every block.

Once the motion vectors have been calculated for every block, movement amount for the whole screen is then calculated (S115). Here, an average of all motion vectors is calculated using motion vectors for every block that were calculated in step S113.

If movement amount for the whole screen has been calculated, a movement amount for the main subject is then calculated (S117). Here, a movement amount for a main subject, for example, a face that has been detected by face detection, or a subject that has been instructed by the photographer on a touch panel etc., is calculated using motion vectors for every block that were calculated in step S113.

If movement amount for the main subject has been calculated, correction of a reference movement amount is then carried out (S119). Here, the reference movement amount that was calculated in step S111 is multiplied by a correction coefficient corresponding to the movement amount for the whole screen that was calculated in step S115. The resulting value from this multiplication is further multiplied by a correction coefficient corresponding to movement amount of the main subject.

Once the reference movement amount has been corrected, the original processing flow is returned to. In step S99 (FIG. 16) focus movement of the focusing lens 203 is carried out using the reference movement amount that has been corrected in step S119. As a result, the movement speed of the focusing lens 203 is controlled depending on the movement amount of the entire screen and of the main subject.

Figure 20A:
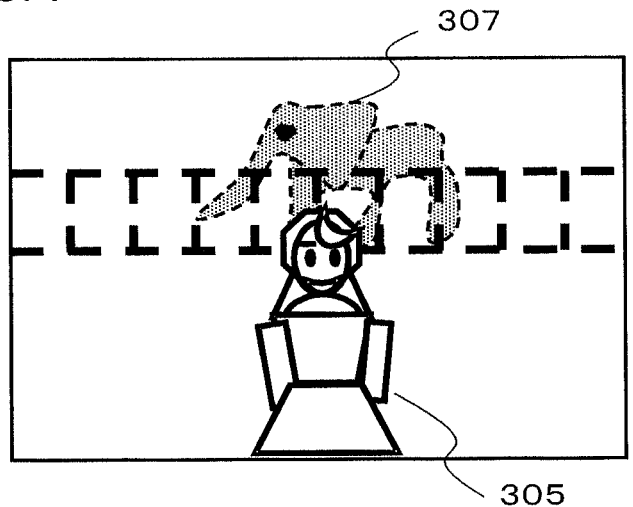
FIG. 20A-FIG. 20C are drawings showing the appearance of changing lens drive speed in accordance with a photographed scene, in the digital camera of one embodiment of the present invention.
Figure 20B:
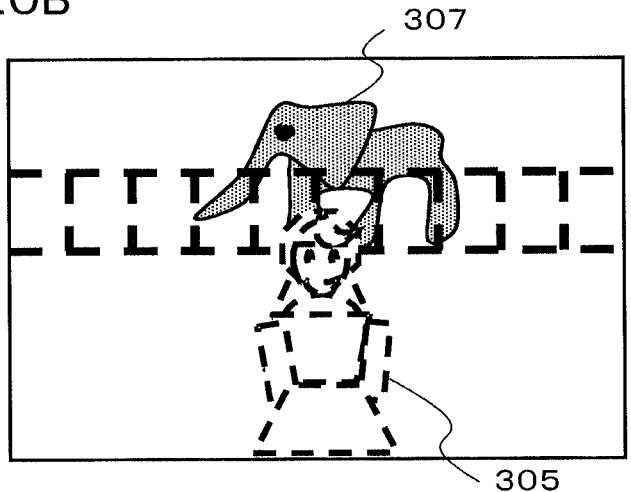

For example, with the example shown in FIG. 20A and FIG. 20B, a case is assumed where initially a subject 305 at the front of the scene is manually focused on, and from that state a subject 307 behind the subject 305 is focused on using RF mode (MF mode). Since there is almost no movement in either the subject to the front 305 or the subject to the rear 307, movement amount overall and movement amount of the main subject is small, and as a result the value of the correction coefficient becomes small, the reference movement amount is also small, and focus movement from the front to the rear is carried out at a slow drive speed.

Figure 20C:
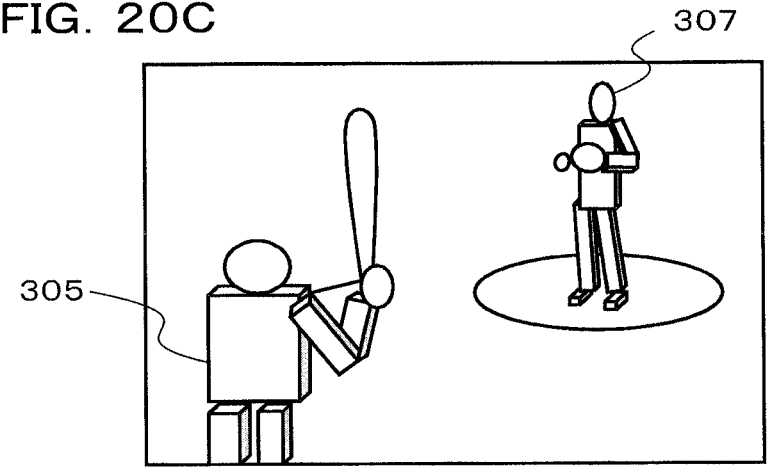

On the other hand, with the example shown in FIG. 20C, the subject to the front 305, which is the main subject, is a batter, while a subject to the rear 307, constituting another main subject, is a picture, and so the corrected reference movement amount becomes large. As a result, in the case of moving the focus between the subject in front 305 and the subject at the rear 307, drive is carried out at high speed.

In this way, with the flow for movement amount acquisition of this embodiment, drive speed of the focusing lens 203 is changed in accordance with movement of the whole screen and movement of the subject. As a result, it is possible to carry out focus movement that matches the photographed scene.

Next a modified example of the flow for movement amount acquisition will be described using FIG. 19. With the movement amount acquisition flow of the one embodiment of the present invention, overall and main subject movement amounts were calculated based on image data. With this modified example however, movement amount of the main subject is calculated based on image data, but overall movement amount is calculated based on output of a sensor provided in the camera.

With this modified example, a motion sensor or orientation sensor for detecting movement of the camera are provided within the camera. While it is possible to provide dedicated sensors, it is also possible to make use of a hand-shake sensor, for preventing hand-shake, for this purpose.

Figure 19:
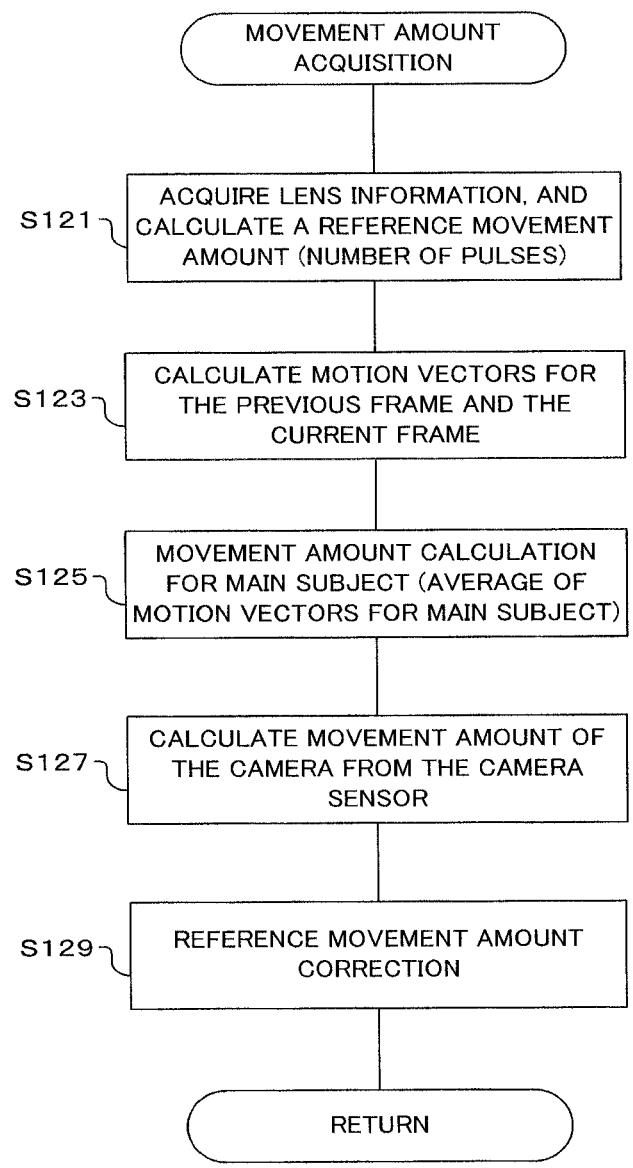
FIG. 19 is a flowchart showing a modified example of processing for movement amount acquisition of the camera of one embodiment of the present invention.

If the movement amount acquisition flow shown in FIG. 19 is entered, first, lens information is acquired, and a reference movement amount (number of pulses) is calculated (S121). Here, similarly to the case of step S111, lens information is acquired by means of communication with the interchangeable lens 200. Also, as with step S111, a reference movement amount is calculated.

Continuing on, motion vectors for the previous frame and the current frame are calculated (S123). As with step S113, motion vectors for every block are calculated using image data of the previous frame and the current frame.

Once the motion vectors have been calculated, movement amount for the main subject is then calculated (S125). Here, as in step S117, movement amount for the main subject, such as a face that has been detected by face detection, is calculated based on the motion vectors that were calculated in step S123.

If movement amount for the main subject has been calculated, movement amount of the camera is next calculated from the camera sensor (S127). With this modified example, movement amount of the camera is calculated based on sensor output for detecting camera movement such as a motion sensor or an orientation sensor that is provided inside the camera.

If movement amount for the camera has been calculated, correction of a reference movement amount is then carried out (S129). Here, a correction coefficient corresponding to the movement amount of the camera that was calculated in step S127 is multiplied by the reference movement amount that was calculated in step S121. The result of this multiplication is further multiplied by a correction coefficient corresponding to movement amount of the main subject.

Once the reference movement amount has been corrected, the original processing flow is returned to. Similarly to the case of the one embodiment of the present invention, in step S99 (FIG. 16) focus movement of the focusing lens 203 is carried out using the reference movement amount that has been corrected in step S119. The result becomes the movement speed of the focusing lens 203, depending on the movement amount of the entire screen and of the main subject.

With this modified example also, similarly to the one embodiment of the present invention, drive speed of the focusing lens 203 is changed in accordance with movement of the whole screen and movement of the subject. As a result, it is possible to carry out focus movement that matches the photographed scene.

As has been described above, with the one embodiment are modified example of the present invention, if RF mode or MF/AF mode is switched to (S51 in FIG. 14) as a result of a slide operation of the ring member (MF ring 204), drive control of the focusing lens is carried out at different speeds (S103, S97, S99 in FIG. 16) for when movie shooting is in progress and when in shooting standby (S91 in FIG. 16). Also, with the one embodiment of the present invention if RF mode or MF/AF mode is switch to (S51 in FIG. 14) as a result of slide operation of the ring member, the focusing lens is driven to a distance corresponding to the set mode at a first speed or a second speed (S103, S97, S99 in FIG. 16). As a result, at the time of switching focusing, it is possible to switch drive speed of a focusing lens in accordance with camera state.

Figure 17:
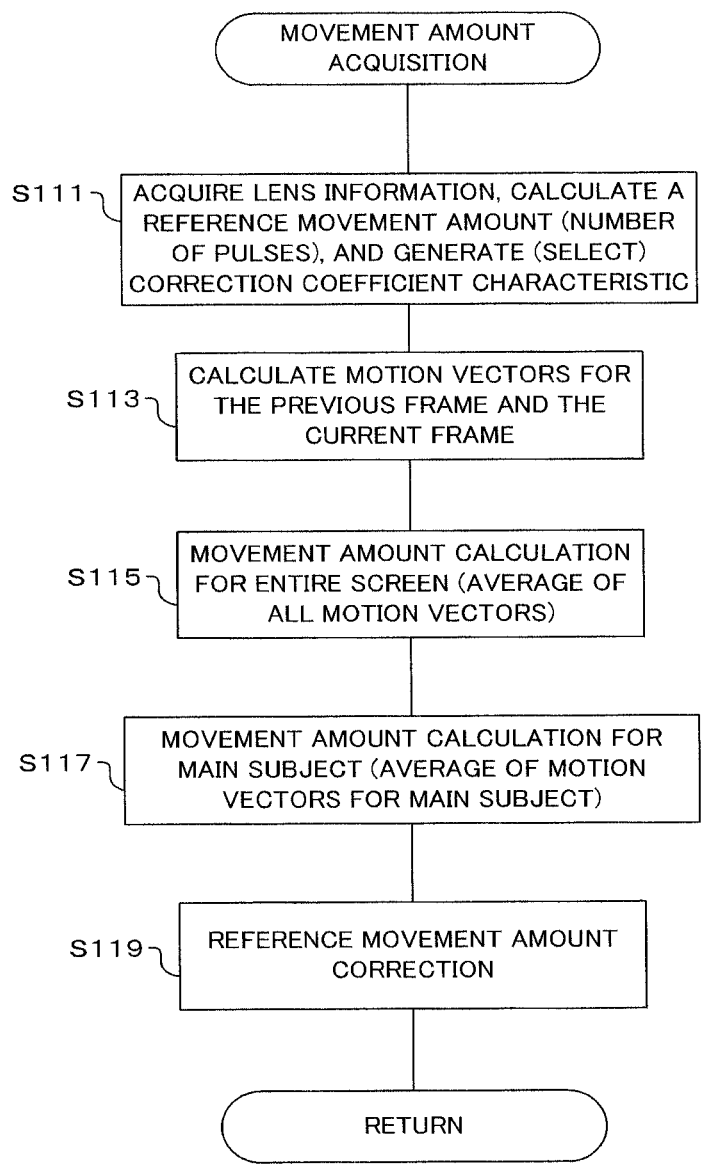
FIG. 17 is a flowchart showing processing for movement amount acquisition of the camera of one embodiment of the present invention.

Also, with the one embodiment of the present invention, when carrying out focus to a preset distance, drive speed of the focusing lens is controlled based on a movement amount that has been determined by the movement determination section (S111-S119 in FIG. 17, S121-S129 in FIG. 20). As a result, it is possible to make drive speed of a focusing lens accord with subject state.

Also, in the one embodiment of the present invention, the MF ring 204, as the ring member, constitutes, at the first position, a manual focusing member at the time of MF mode, or at the second position constitutes a distance setting member at the time of RF mode. It is therefore possible to have a single ring member act as an adjustment member having two functions, and it is possible to reduce the size.

With one embodiment of the present invention, both AF mode and MF mode are switched at the camera body 100, but the focusing modes at the camera body 100 side are not limited to two modes, and it is also possible to provide other focusing modes, and it is also possible to provide only one or the other of the AF mode and the MF mode.

Also, with the one embodiment of the present invention, the MF ring 204, as the ring member has been moved between two positions, namely a first position and a second position, but it is also possible to provide other positions, such as a third position. Also in the one embodiment of the present invention, switching of MF/AF mode and RF mode was carried out using the ring member. However, this is not limiting, and it is also possible to switch the two modes using a switch etc.

Further, with the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

Also, regarding the operation flow in the patent claims, the specification and the drawings, for the sake of convenience description has been given using words representing sequence, such as "first" and "next", but this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. For use in an imaging device capable of transitioning from live view mode to movie shooting mode, and including (1) a focusing lens provided in a lens barrel, (2) a lens drive section for driving the focusing lens, (3) a ring member which is arranged to be rotatable with respect to a lens barrel, and arranged to move to either a first position or a second position by sliding along an optical axis, (4) a slide position detection section for detecting whether the ring member is positioned at the first position or the second position, when the ring member has been subjected to slide movement along the optical axis, (5) a first detection section for outputting rotation amount for a rotation operation of the ring member, when it has been detected by the slide position detection section that the ring member is at the first position, (6) a second rotation position detection section for outputting a discrete preset distance, determined using a position that has been set by a rotation operation of the ring member, when it has been detected by the slide position detection section that the ring member is at the second position, and (7) a storage section for storing the preset distance set when the ring member is at the second position, a method comprising:

determining movement of a subject;

controlling the lens drive section to drive the focusing lens to a specified position, move the focusing lens to focus at the preset distance stored in the storage section at a first speed, when the ring member has been switched from the first position to the second position in the live view mode, and move the focusing lens to focus at the preset distance stored in the storage section at a second speed that is slower than the first speed, when the ring member has been switched from the first position to the second position in the movie shooting mode, wherein the second speed of the focusing lens when moving the focusing lens to focus at the preset distance is controlled based on the movement of the subject that has been determined, and wherein, in the movie shooting mode, the focusing lens is driven slowly so as to focus more gradually than in the live view mode;

storing the preset distance set when the ring member is at the first position;

moving the focusing lens to focus at the preset distance stored in the storage section at the first speed, when the ring member has been switched from the second position to the first position in the live view mode; and moving the focusing lens to focus at the preset distance stored in the storage section at the second speed that is slower than the first speed, when the ring member has been switched from the second position to the first position in the movie shooting mode.

2. An imaging device capable of transitioning from live view mode to movie shooting mode, comprising:

a focusing lens provided in a lens barrel;

a lens drive section for driving the focusing lens;

a ring member which is arranged to be rotatable with respect to a lens barrel, and arranged to move to either a first position or a second position by sliding along an optical axis;

a slide position detection section for detecting whether the ring member is positioned at the first position or the second position, when the ring member has been subjected to slide movement along the optical axis;

a first detection section for outputting rotation amount for a rotation operation of the ring member, when it has been detected by the slide position detection section that the ring member is at the first position;

a second rotation position detection section for outputting a discrete preset distance, determined using a position that has been set by a rotation operation of the ring member, when it has been detected by the slide position detection section that the ring member is at the second position;

a storage section for storing the preset distance set when the ring member is at the second position;

a movement determination section for determining movement of a subject; and a control section for controlling the lens drive section to drive the focusing lens to a specified position, wherein the control section moves the focusing lens to focus at the preset distance stored in the storage section at a first speed, when the ring member has been switched from the first position to the second position in the live view mode, moves the focusing lens to focus at the preset distance stored in the storage section at a second speed that is slower than the first speed, when the ring member has been switched from the first position to the second position in the movie shooting mode, and in the movie shooting mode, drives the focusing lens slowly so as to focus more gradually than in the live view mode, controls the second movement speed of the focusing lens when moving the focusing lens to focus at the preset distance based on the movement of the subject that has been determined by the movement determination section, wherein the storage section further stores the preset distance set when the ring member is at the first position, and wherein the control section further moves the focusing lens to focus at the preset distance stored in the storage section at the first speed, when the ring member has been switched from the second position to the first position in the live view mode, and moves the focusing lens to focus at the preset distance stored in the storage section at the second speed that is slower than the first speed, when the ring member has been switched from the second position to the first position in the movie shooting mode.

3. The imaging device of claim 2 wherein during shooting standby, there is a live view state before the movie shooting.

4. The imaging device of claim 2 wherein:

the movement determination section corrects a reference movement amount for the focusing lens based on movement amount of an entire screen and movement amount of a main subject, and the control section sets the second movement speed to a speed according to movement of a subject, based on the corrected reference movement amount of the focusing lens.

\* \* \* \* \*